US010745083B2

(12) United States Patent
Zadorozhnyy

(10) Patent No.: US 10,745,083 B2
(45) Date of Patent: Aug. 18, 2020

(54) OMNI DIRECT MODULAR MULTI-HULL HYDROFOIL VESSEL INTEGRATED WITH RENEWABLE-ENERGY SOURCES

(71) Applicant: Volodymyr Zadorozhnyy, Brooklyn, NY (US)

(72) Inventor: Volodymyr Zadorozhnyy, Brooklyn, NY (US)

( * ) Notice: Subject to any disclaimer, the term of this patent is extended or adjusted under 35 U.S.C. 154(b) by 0 days.

(21) Appl. No.: 15/937,813

(22) Filed: Mar. 27, 2018

(65) Prior Publication Data

US 2020/0010151 A1 Jan. 9, 2020

Related U.S. Application Data

(60) Provisional application No. 62/477,354, filed on Mar. 27, 2017.

(51) Int. Cl.
| | |
|---|---|
| *B63B 1/26* | (2006.01) |
| *B63B 1/12* | (2006.01) |
| *B63B 1/10* | (2006.01) |
| *B63H 9/061* | (2020.01) |
| *B63B 35/00* | (2020.01) |
| *B63B 35/44* | (2006.01) |

(52) U.S. Cl.
CPC .............. *B63B 1/125* (2013.01); *B63B 1/107* (2013.01); *B63H 9/061* (2020.02); *B63B 1/26* (2013.01); *B63B 2035/007* (2013.01); *B63B 2035/008* (2013.01); *B63B 2035/446* (2013.01); *B63B 2035/4453* (2013.01)

(58) Field of Classification Search
CPC ... B63B 2001/126; B63B 1/125; B63B 1/107; B63B 1/26; B63H 9/061
See application file for complete search history.

(56) References Cited

U.S. PATENT DOCUMENTS

| | | | | |
|---|---|---|---|---|
| 3,461,828 A | * | 8/1969 | Bielstein | B63B 35/4413 114/265 |
| 4,996,935 A | * | 3/1991 | Takeuchi | B63B 1/107 114/163 |
| 2013/0106193 A1 | * | 5/2013 | Bryson | F03D 9/007 307/73 |
| 2014/0143169 A1 | * | 5/2014 | Lozito | G06Q 50/28 705/333 |

OTHER PUBLICATIONS

"Towards a hydrogen society: Toyota France supports Energy Observer, the world's first hydrogen-powered boat," Energy Observer, http://www.energy-observer.org/en/#actu, Brussels, Belgium, Aug. 24, 2017, 2 pgs.

* cited by examiner

*Primary Examiner* — Stephen P Avila
(74) *Attorney, Agent, or Firm* — Bekiares Eliezer LLP

(57) ABSTRACT

Disclosed herein are hydrofoil vessels and systems integrated with renewable energy sources. In one aspect, the hydrofoil vessel includes one or more hulls, an omni-directional platform connecting the one or more hulls of the hydrofoil vessel. The omni-directional platform may include at least one of: a sail, a wind turbine, a solar panel, a hydroelectric motor, a hydrofoil controller platform, and a battery component. Also disclosed herein are methods and computer readable medium for controlling an omni direct modular hydrofoil vessel having one or more hulls integrated with renewable-energy sources.

20 Claims, 37 Drawing Sheets

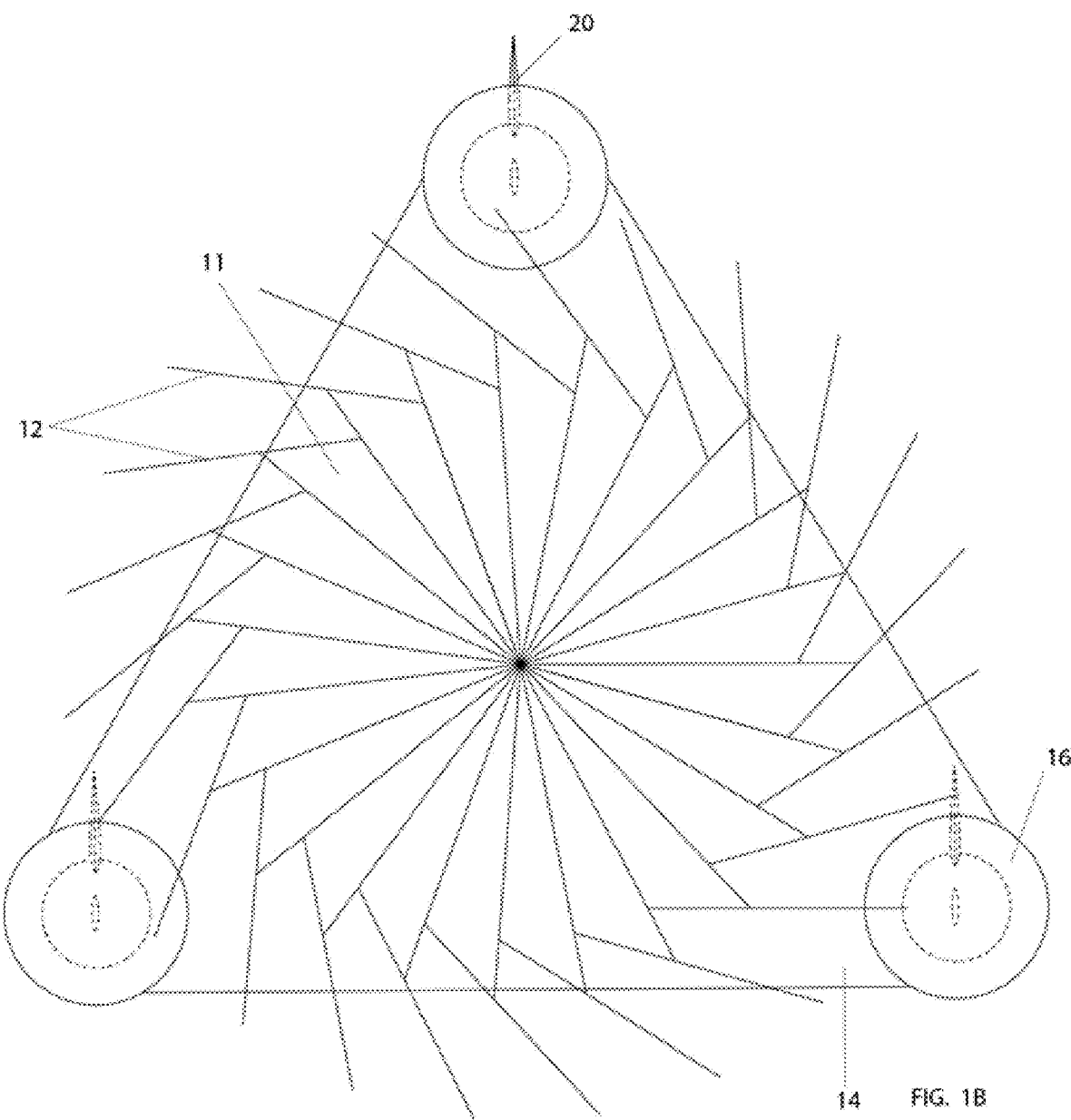

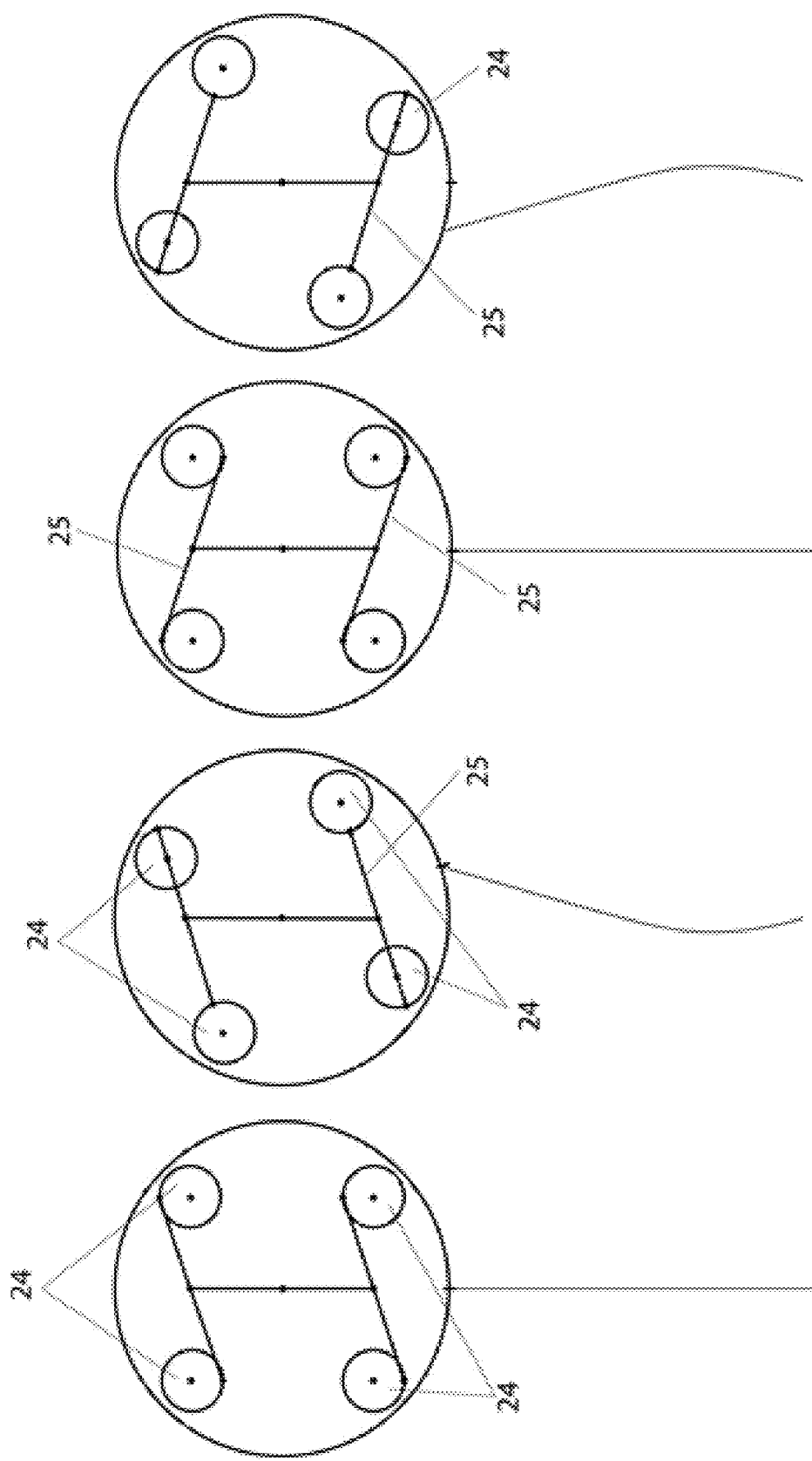

OMNI DIRECT MODULAR MULTI-HULL HYDROFOIL VESSEL INTEGRATED WITH RENEWABLE-ENERGY SOURCES

RELATED APPLICATION(S)

Under provisions of 35 U.S.C. § 119(e), the Applicant claims the benefit of U.S. provisional application No. 62/477,354, filed Mar. 27, 2017, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to hydrofoil vessels having one or more hulls.

BACKGROUND

In some nautical situations, there is a driving need to provide efficient use of energy resources while maintaining the speed and effectiveness of performance for maritime vessels having one or more hulls. There have been various attempts to improve the energy efficiency and streamline the design maritime vessels to overcome the excessive reliance upon gasoline and help maintain the ecological safety of the earth. For example, the Alcyone vessel developed by Jacques Cousteau in 1985, was designed to test the operation of an innovative turbosail which generated power from wind power. While the Alcyone system tested the operation of two turbosails augmenting the diesel engine in a manner generating one-third of the energy, the vessel was extremely heavy, unsteady, and inefficient for practical use. The design did not allow for more efficient use of renewable resources and adaptations to other hydrofoils due to the size of the turbosails.

Another example is the Hydroptere experimental sailing hydrofoil trimaran. While the design sustained a significant speed for short distances, longer distances caused the hydrofoil to capsize. The Hydroptere was not steady enough. It had a high sail position that created additional resistance in water and tended to careen. Additionally, the Hydroptere had a sail structure and hydrofoil which required several crew to operate and control vessel. The structure of the vessel in addition to the crew weight, caused an unequal weight load between fulcrum points, making the vessel unstable. Additionally, such an unstable design does not allow for efficient use of renewable resources.

Thus, the conventional strategy for modern vessels, yachts, boats, catamarans, trimarans, and mono-hulls is to adapt existing ship hulls to accept adaptations to provide for more efficient use of renewable resources. This often causes problems because the conventional strategy does not provide sufficient space on the hull to allow for sizable sources of renewable resources. Moreover, these designs lack safety, stability, and compromise speed. Furthermore, these designs still require a full crew which also reduces effective hull space for renewable resources. There is a need for a more efficient design and functional vessel having one or more hulls that resolves these issues in an effective manner.

BRIEF OVERVIEW

AN OMNI DIRECT MODULAR MULTI-HULL HYDROFOIL VESSEL INTEGRATED WITH RENEWABLE-ENERGY SOURCES may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In various aspects, an omni direct modular multi-hull hydrofoil vessel can comprise a multihull vessel with a wide omni directional body circular structure, providing a wide steady platform (14) for hybrid wind turbine sail (11) technology, combination of horizontal and vertical wind turbine generators, and stiff sail in one structure allowing increase efficiency by multipurpose use. A primary function can include providing efficient sustaining energy use of the hydrofoil vessel by integrating renewable energy technology, hardware, software platforms, and innovative sail designs in a novel manner.

In further aspects, all vessel including wind turbine sail (11), platform (14) and hulls (16) can be covered with solar panels to provide additional energy, which can make the vessel less dependent on wind energy. In still further aspects, the vessel can comprise batteries (29) for storing energy, which in some embodiments, may be located in rudder blades to increases stability and reduce stress on part of or the whole body of the vessel.

In further aspects, omni direct system can change direction of movement without turning the vessel, for example, by turning rudder blades (17) which, in some embodiments, can define direction of the movement, improving maneuverability and increase safety by possibility of immediate change of direction.

In further aspects, hydrofoil system may reduce water resistance, while moving level blades (18) control level of submission to balance the vessel, by keeping hulls (16) with platform (14) of the vessel above the water level.

In still further aspects, vibe motion disk (19), which may be electrically powered, can provide vibrating movements to flipper (20) to create movements similar to fish tail movements, which can provide propel the vessel, in passive state with less water drag compared to traditional propellers.

In further aspects, modular structure can allow separate hulls (16) from the main platform (14) by providing additional inflatable support underneath of the platform. In still further aspects, hulls and platform can be independent and completely sustainable, for example, through the use of integrated solar panels, batteries, and drive units, which can makes vessel safer, more durable and sustainable.

In further aspects, magnetic lock (26) may be present between hull (16) and rudder blade (17) which can secure the system from damage in case of collision or hitting something under water, and after separation can facilitate coupling parts together, saving time and preventing damage to the hulls (16) and hydrofoil system. In still further aspects, a secure cable may be employed to prevent losing a disconnected part. In yet further aspects, the vessel can be fully autonomous, controlled remotely or by autopilot.

In various aspects, embodiments of the present invention may provide vessel that are more efficient, easier to control, more maneuverable, completely sustainable, safer and more durable than prior art.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 1B shows top straight view of an exemplary embodiment of a vessel consistent with the present disclosure.

FIG. 7A shows an exemplary embodiment of a rotation cycle of a vibe motion disk consistent with the present disclosure.

FIG. 7B shows an exemplary embodiment of a rotation cycle of a vibe motion disk consistent with the present disclosure.

FIG. 7C shows an exemplary embodiment of a rotation cycle of a vibe motion disk consistent with the present disclosure.

FIG. 7D shows an exemplary embodiment of a rotation cycle of a vibe motion disk consistent with the present disclosure.

DETAILED DESCRIPTION

Figure 1A:
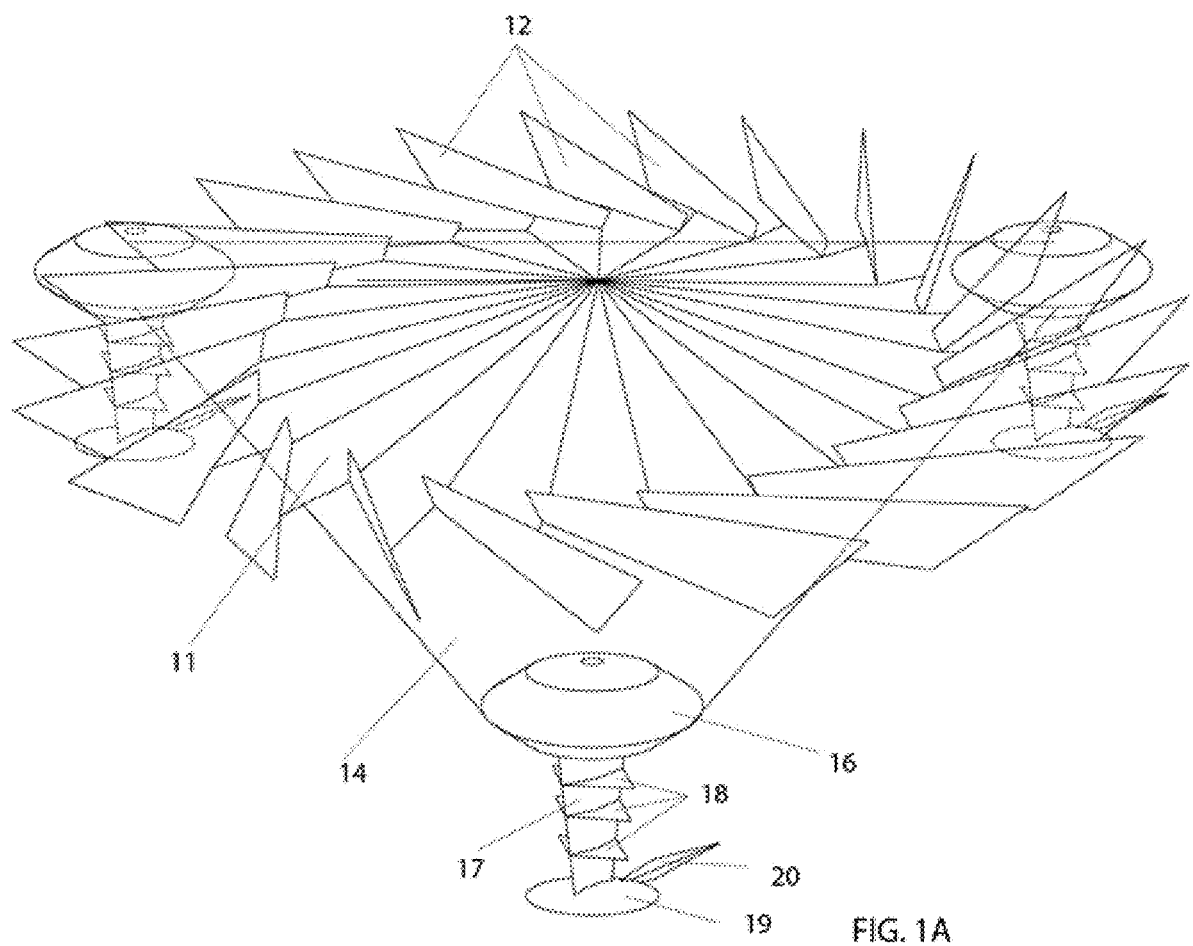
FIG. 1A shows a perspective view of an exemplary embodiment of a vessel consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of a hydrofoil vessel having one or more hulls, embodiments of the present disclosure are not limited to use only in this context.

According to various aspects of the present invention, the disclosed omni-direct modular multihull hydrofoil vessel with renewable-energy technologies may have one or more of the following advantages:
  is more versatile.
  is more sustainable due to use of renewable energy sources, such as wind turbine sail, and solar panels.
  is faster because of big sail, lightweight, lower water drag, and aerodynamic shape of the capsules (hulls).
  is more stable because of the widely located fulcrum, the lower position of the sail and adjustable hydrofoil system.
  is more efficient because the new turbine sail structure. It creates lift force to support vessel which reduce careen and tension on body structure and reduce load on hydrofoil system such as that reduce water resistance, hydrodynamic drag, what makes vessel performance better than prior art.
  is safer because vessel can be separated into sustainable modules if it needed or in case of emergency.
  is more maneuverable because of rudder blades can change direction immediately without turning the ship.
  is easier to control structure, does not require a crew to control, can be completely automatic including remote control by voice smartphone or by the internet.
  is environmentally friendly, pollution-free and vibe motion motor is safer for the environment.
  is new structure where around 15-25% of many parts are repeating, multiple times, which makes production costs, assembling, repair, simple, easy and affordable.

Figure 1C:
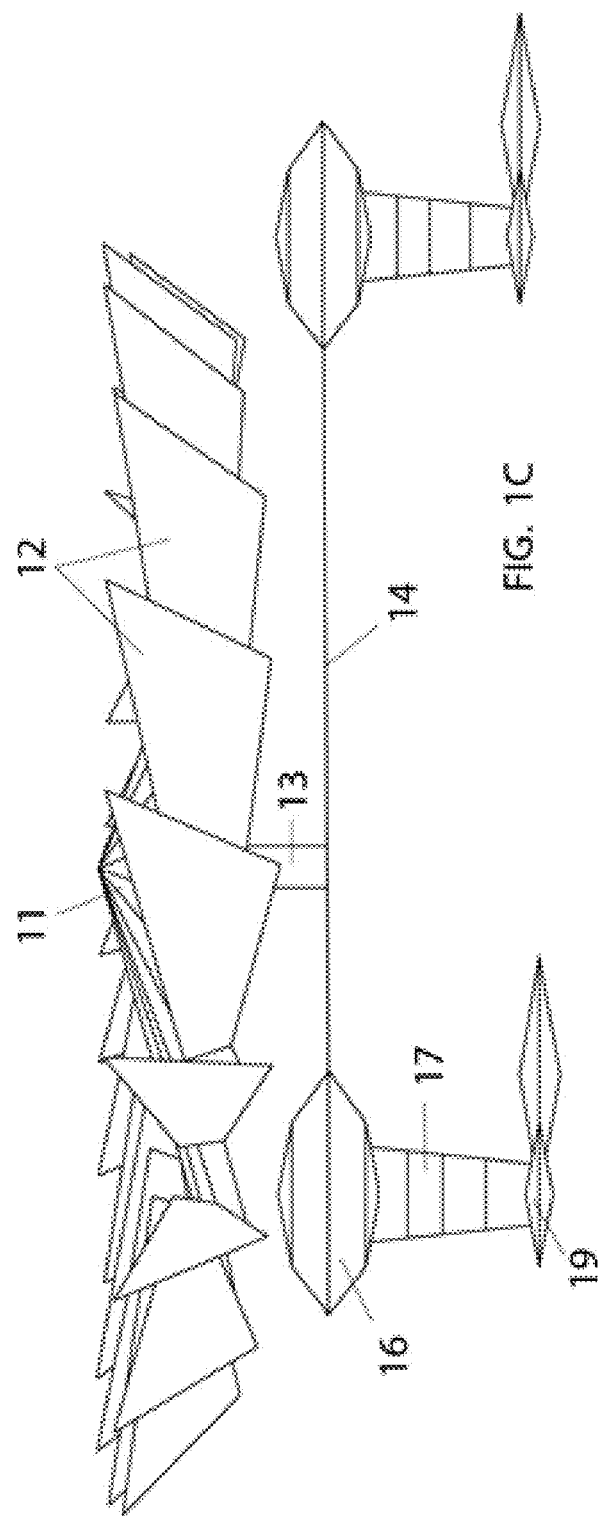
FIG. 1C shows side straight views of an exemplary embodiment of a vessel with horizontal wind turbine sail position and fully open wind turbine blades consistent with the present disclosure.

FIG. 1A to FIG. 1C show perspective, top straight and side straight views of vessel, with wind turbine sail 11 in horizontal parallel to base platform 14 position and wind turbine blades 12 in open 90°, that active vertical wind turbine which generate electricity out of wind and solar panels without exposing sail to the wind.

Figure 2A:
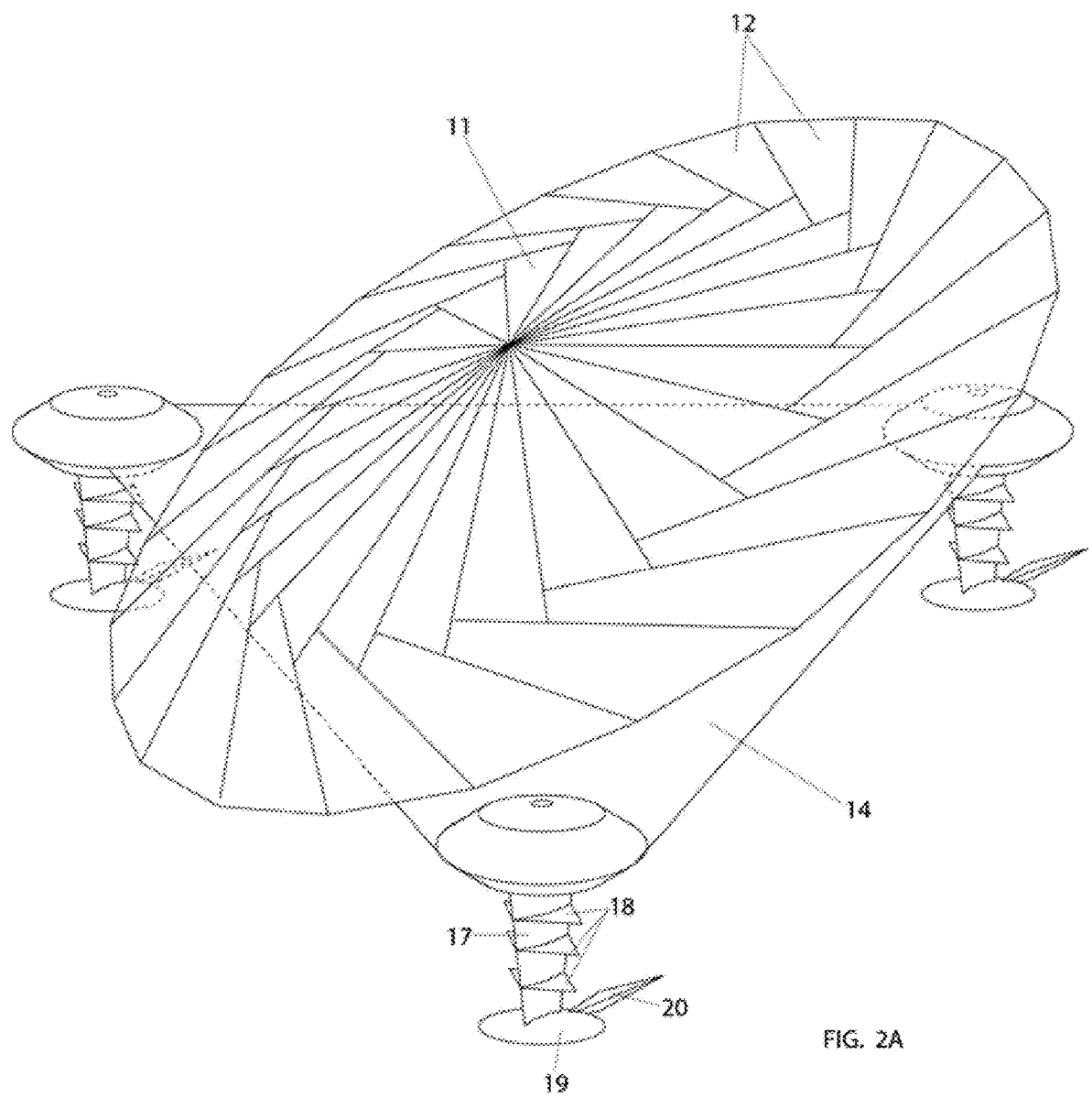
FIG. 2A shows a perspective view of an exemplary embodiment of a vessel consistent with the present disclosure.
Figure 2B:
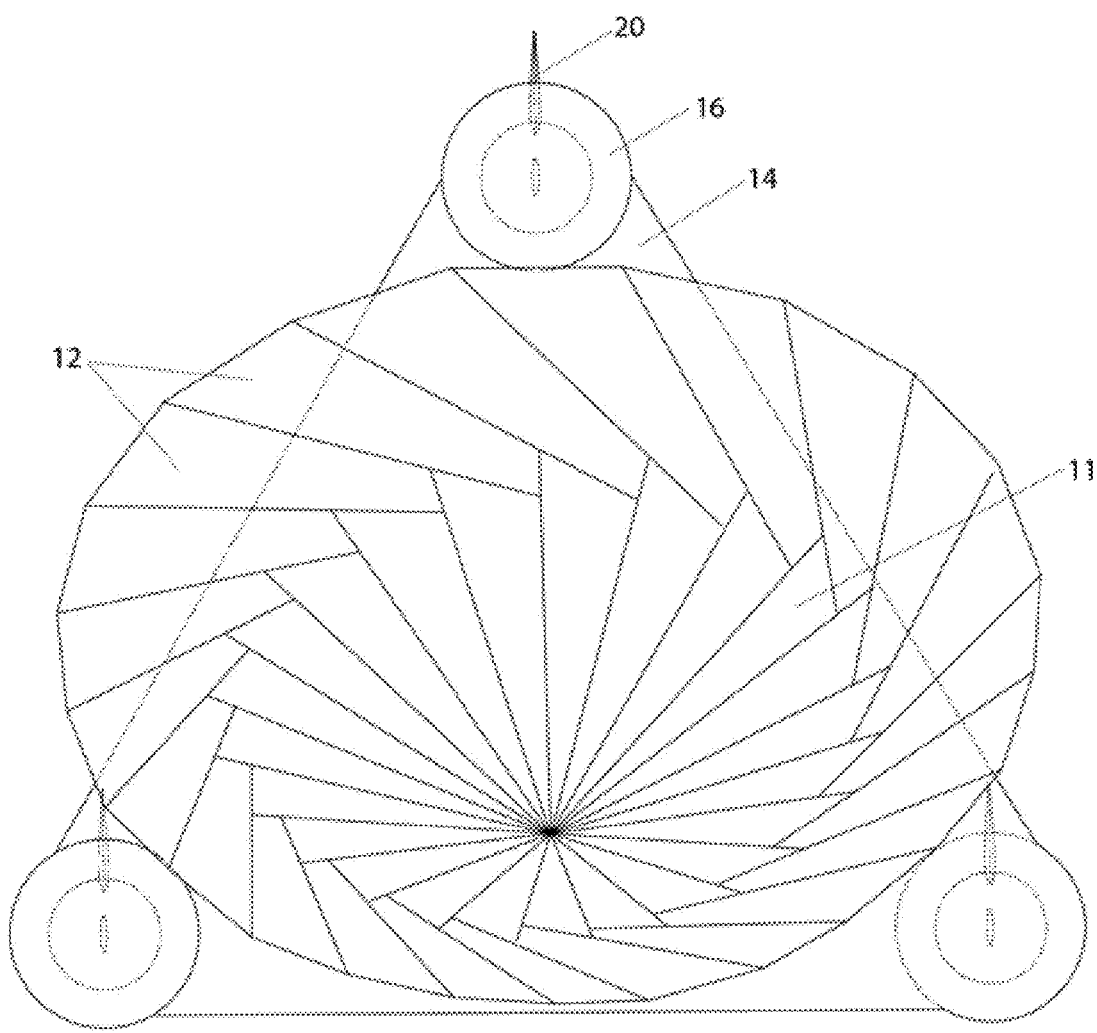
FIG. 2B shows a top straight view of an exemplary embodiment of a vessel consistent with the present disclosure.
Figure 2C:
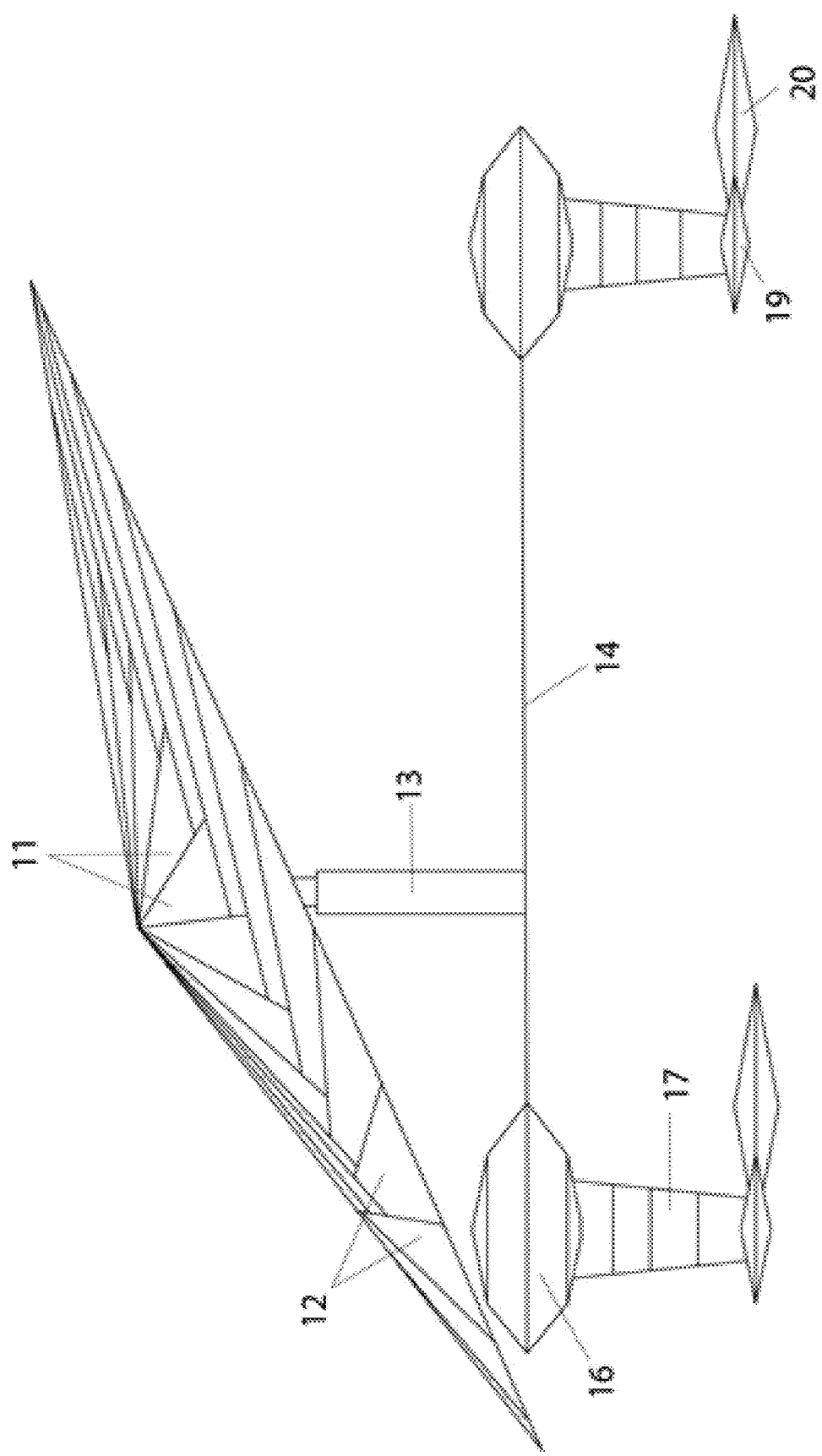
FIG. 2C shows a sight straight view of an exemplary embodiment of a vessel with active wind turbine sail position and closed wind turbine blades consistent with the present disclosure.
Figure 3A:
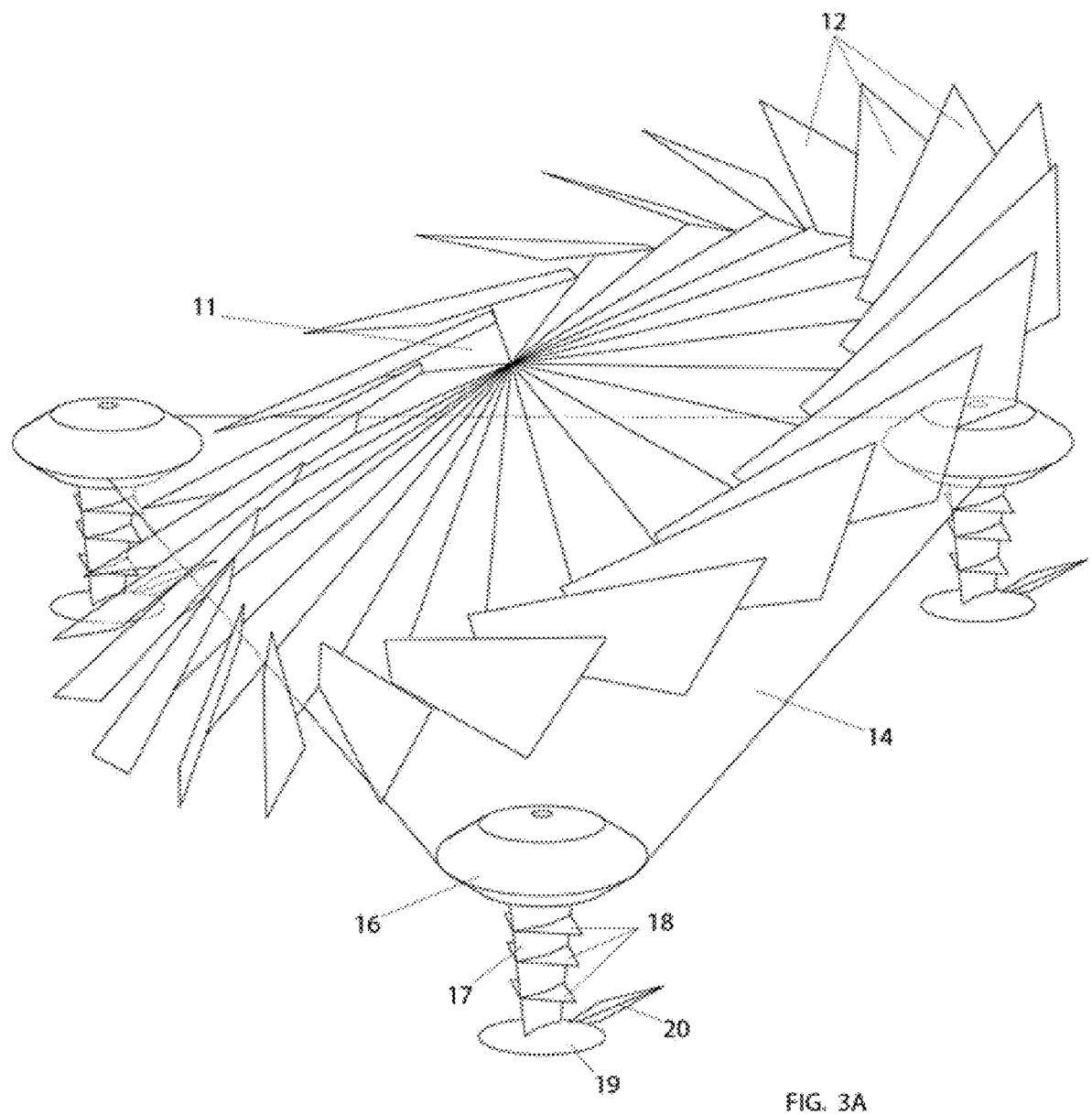
FIG. 3A shows a perspective view of an exemplary embodiment of a vessel consistent with the present disclosure.
Figure 3B:
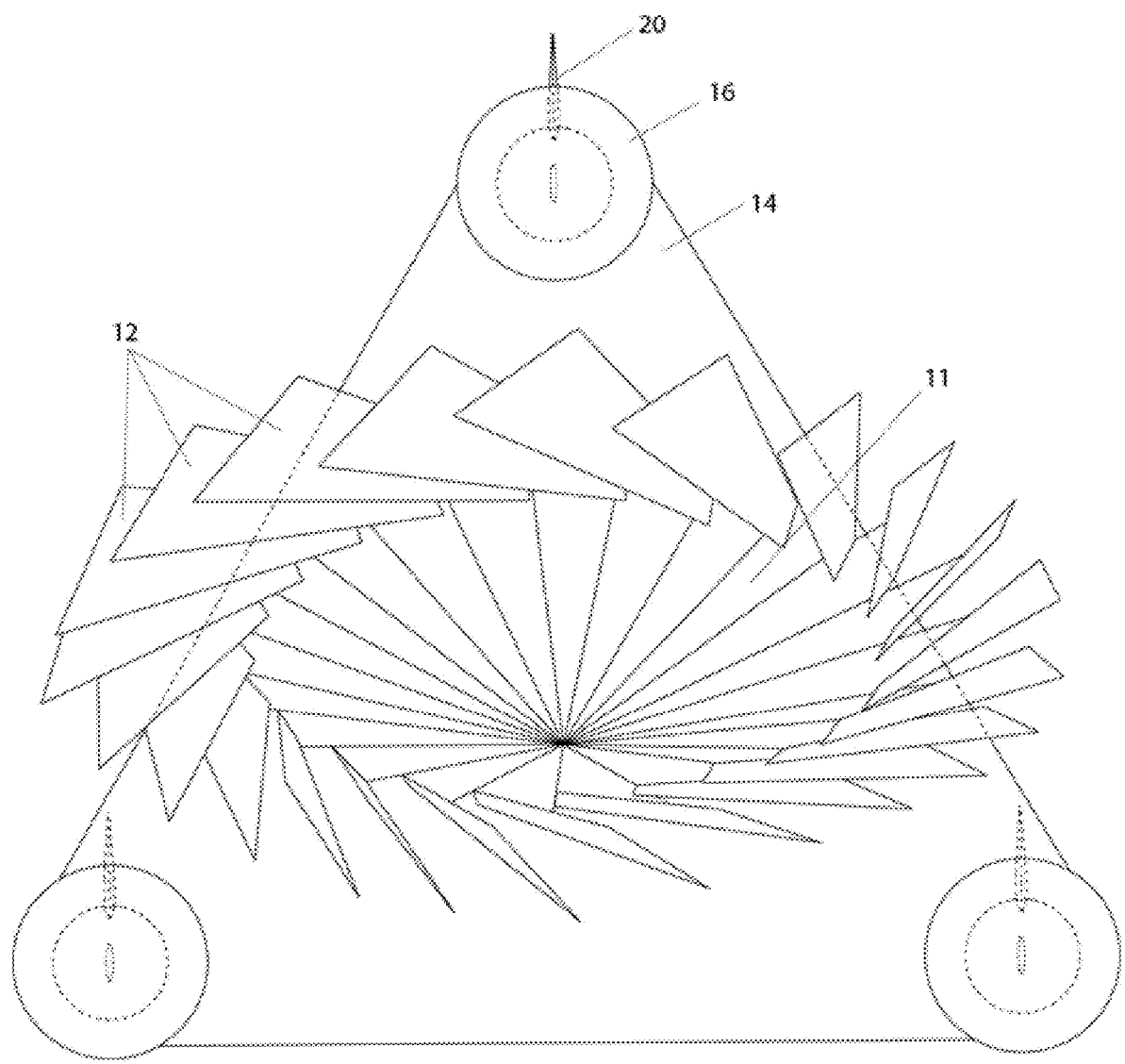
FIG. 3B shows a top straight view of an exemplary embodiment of a vessel consistent with the present disclosure.
Figure 3C:
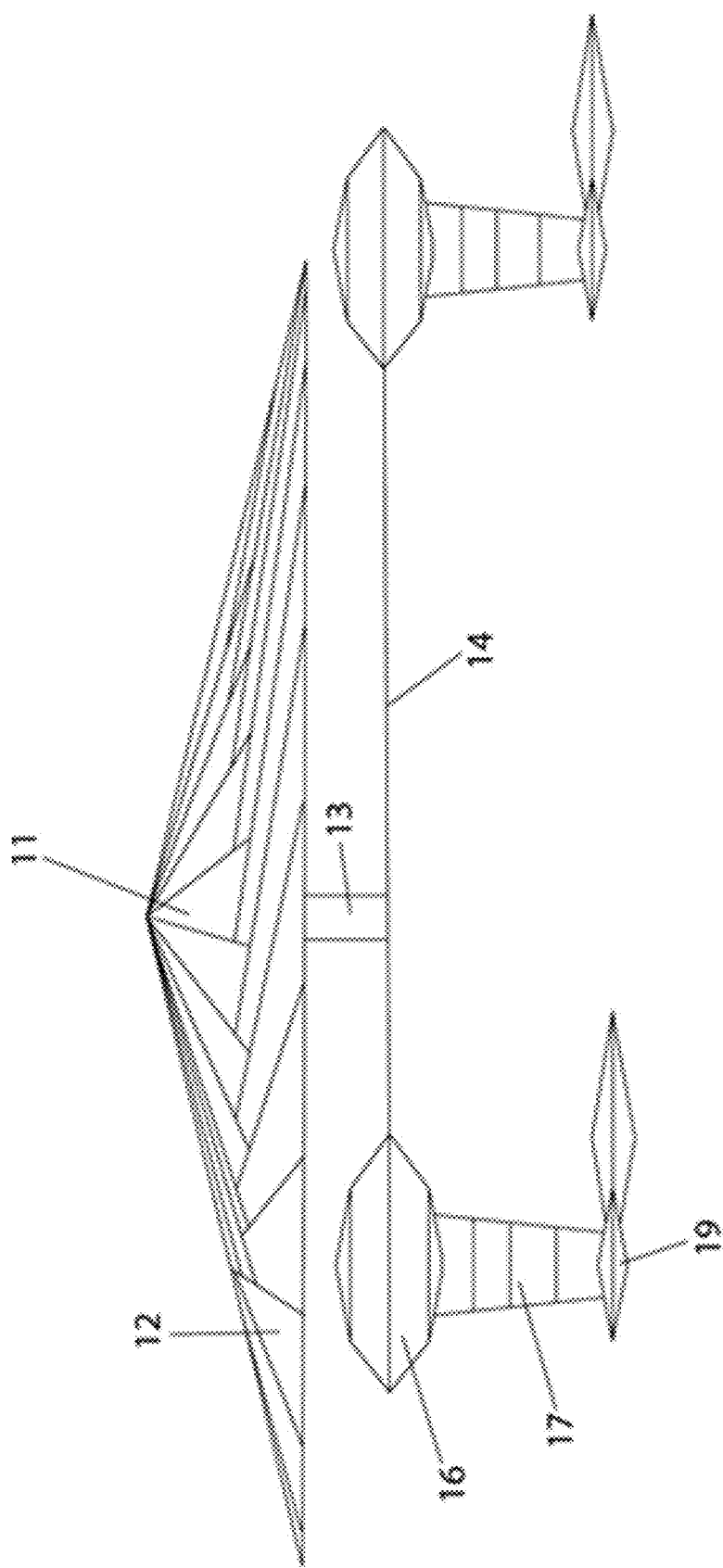
FIG. 3C shows side straight views of an exemplary embodiment of a vessel with active wind turbine sail position and half open wind turbine blades.

FIG. 2A to FIG. 2C show perspective, top straight and side straight views of vessel with active wind turbine sail 11 position, the wind turbine sail 11 is not parallel to the base platform 14 and wind turbine blades 12 close forming bigger size of the sail to capture more sail wind, at the same time wind turbine generator 21 not active, solar panels become main source of renewable energy. FIG. 3A to FIG. 3C show perspective, top straight and side straight views of vessel with active wind turbine sail 11 is not parallel to the base platform 14, wind turbine blades 12 are half open in order to generate electricity from sail wind, acting like horizontal wind turbine generator, as well as solar panels produce electric at the same time.

Figure 4A:
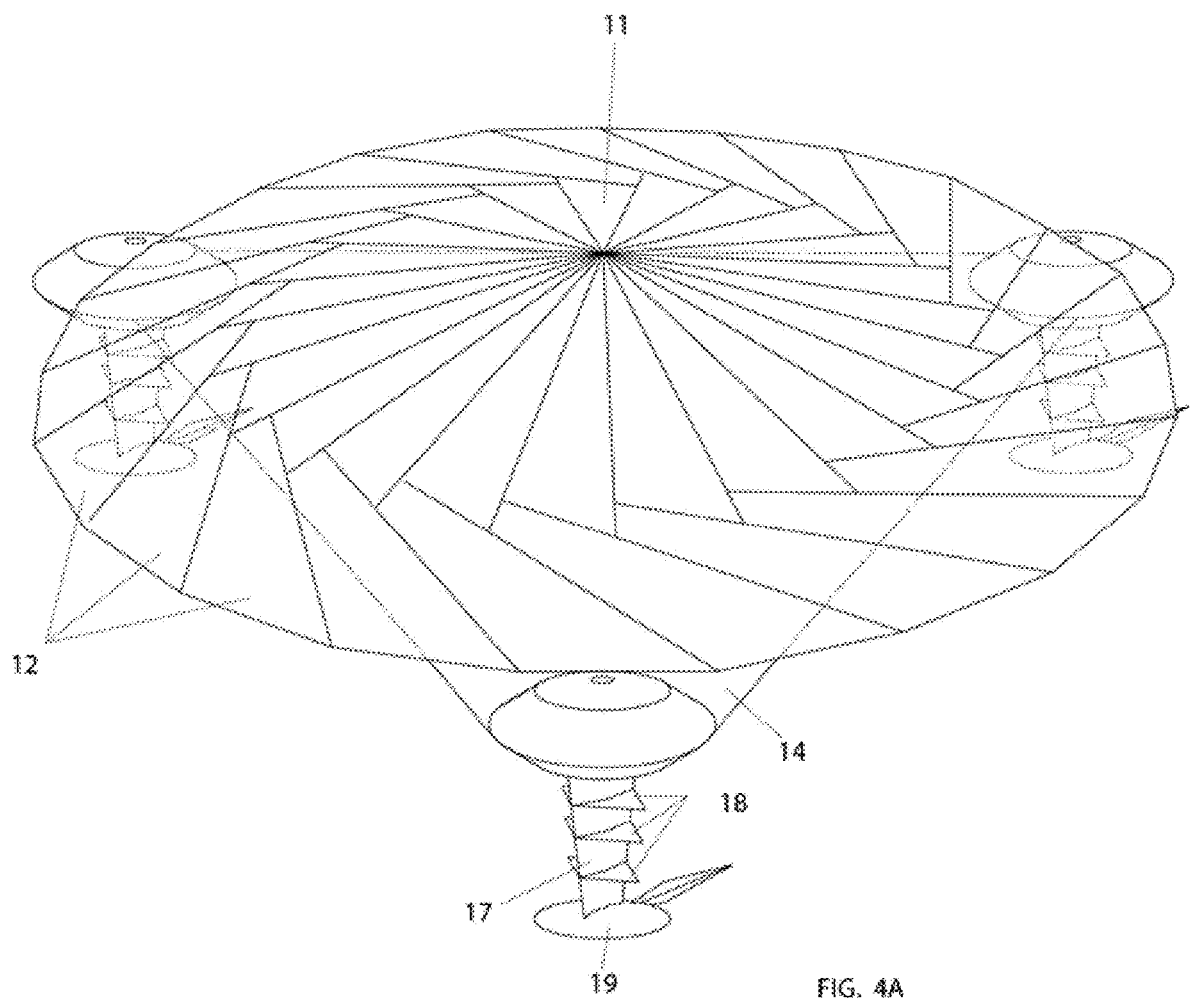
FIG. 4A shows a perspective view of an exemplary embodiment of a vessel consistent with the present disclosure.
Figure 4B:
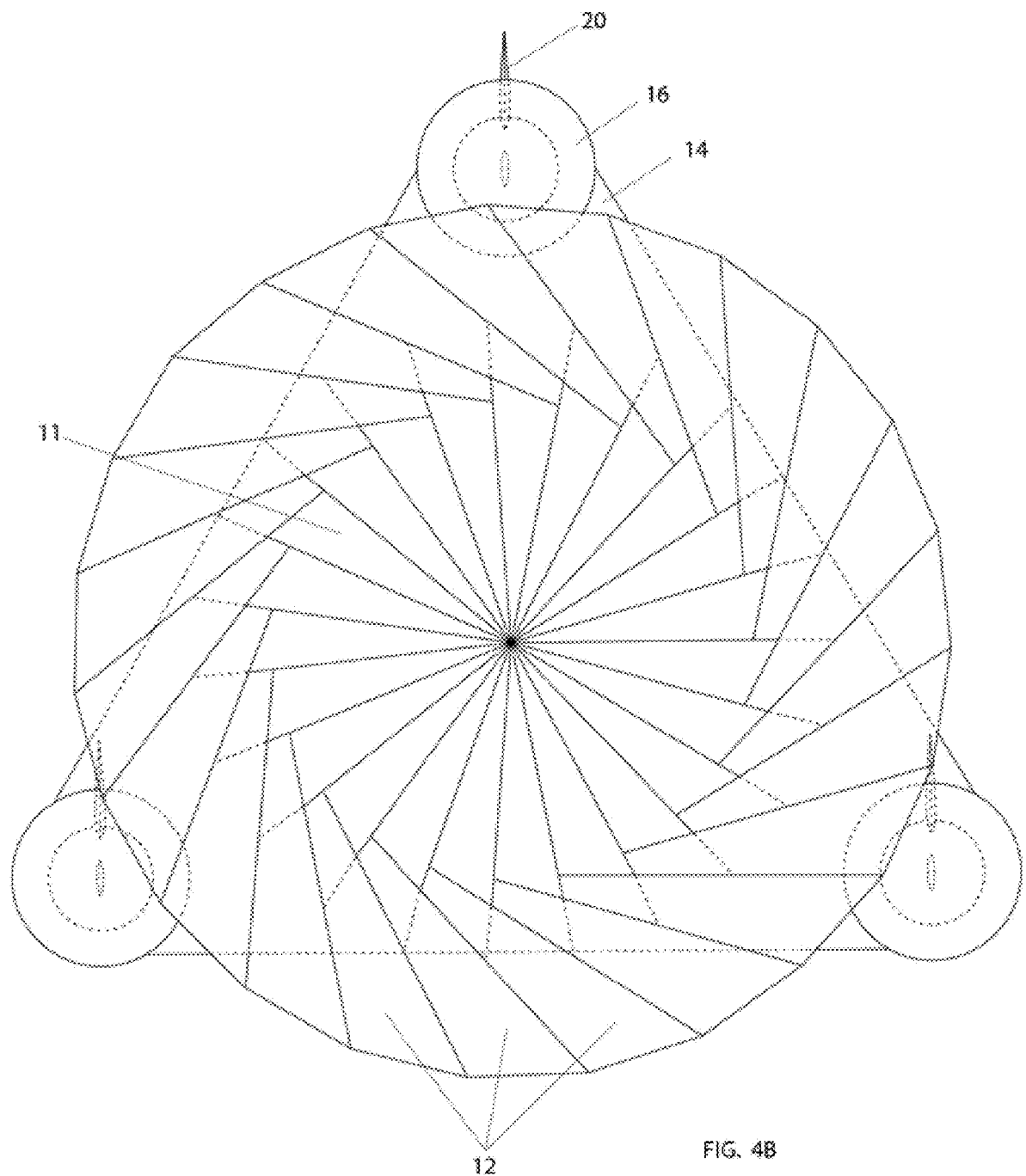
FIG. 4B shows a top straight view of an exemplary embodiment of a vessel consistent with the present disclosure.
Figure 4C:
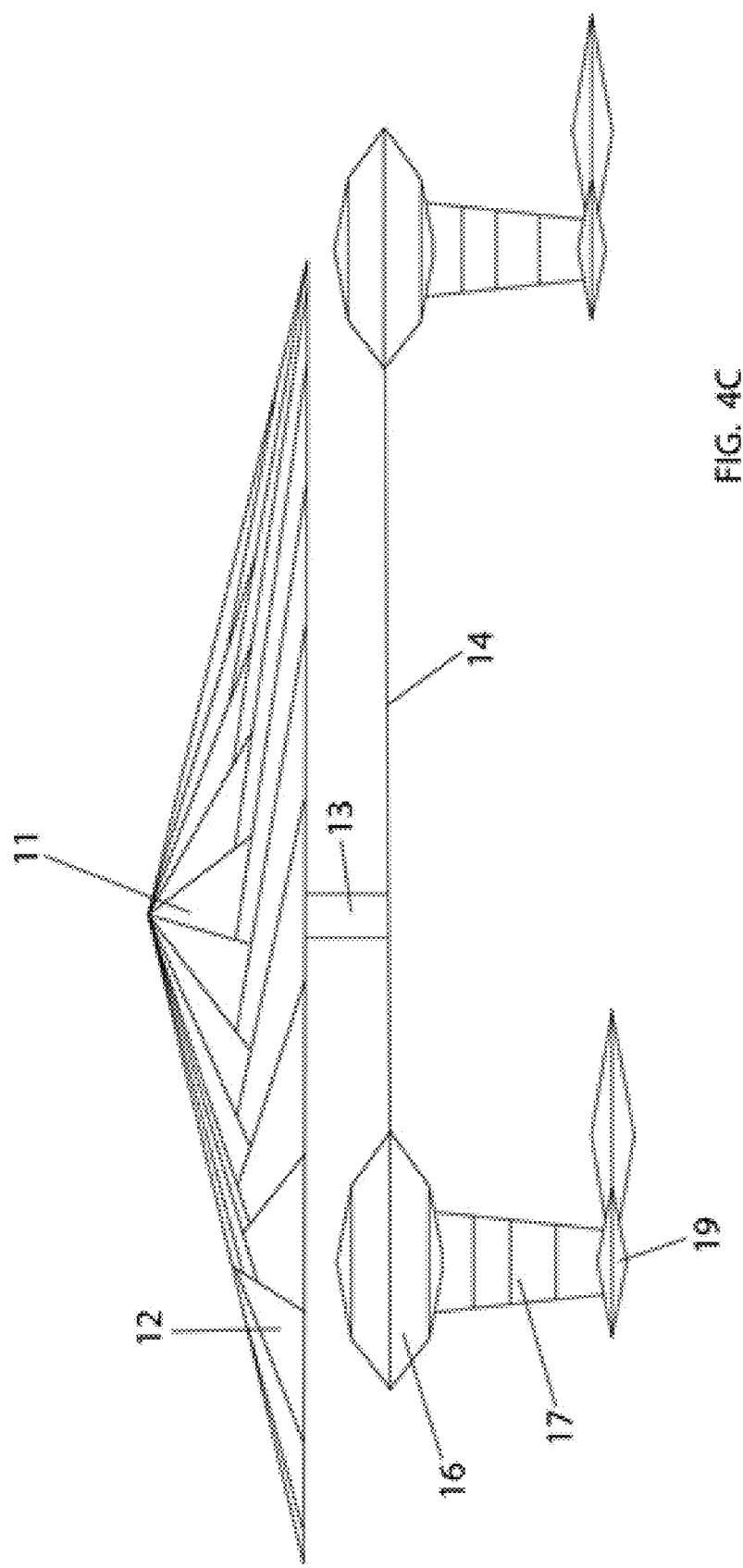
FIG. 4C shows side straight views of an exemplary embodiment of a vessel with horizontal wind turbine sail position and close wind turbine blades consistent with the present disclosure.

FIG. 4A to FIG. 4C show perspective, top straight and side straight views of vessel with horizontal wind turbine sail 11 position and closed wind turbine blades 12 to create strong structure together with base 14, creates less wind resistance in bad weather or creates more space shield from sunlight, wind and rain.

Figure 5A:
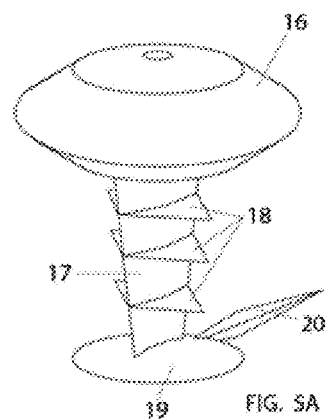
FIG. 5A shows a perspective view of an exemplary embodiment of a vessel consistent with the present disclosure.
Figure 5B:
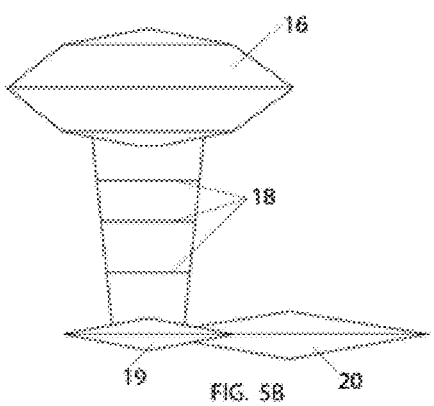
FIG. 5B shows a straight side view of an exemplary embodiment of a vessel consistent with the present disclosure.
Figure 5C:
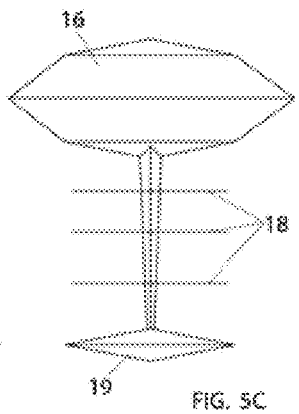
FIG. 5C shows a straight front view of an exemplary embodiment of a hull and hydrofoil system and vibe disc motor consistent with the present disclosure.
Figure 5D:
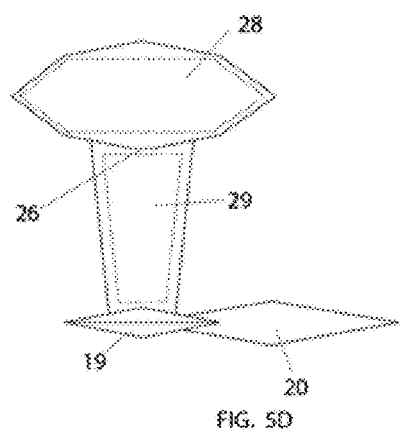
FIG. 5D shows a side view of an exemplary embodiment of a hull with hydrofoil system and vibe disk motor shows living space of the hull and battery position consistent with the present disclosure.
Figure 5E:
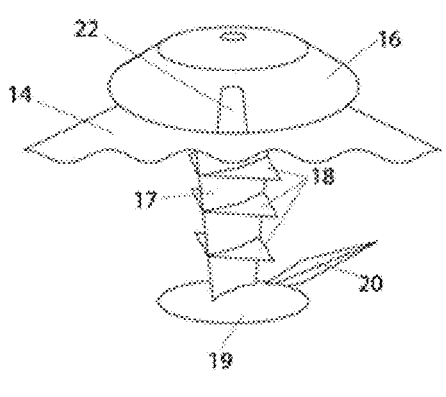
FIG. 5E shows an exemplary embodiment of a proximal hull entrance position toward the platform consistent with the present disclosure.
Figure 5F:
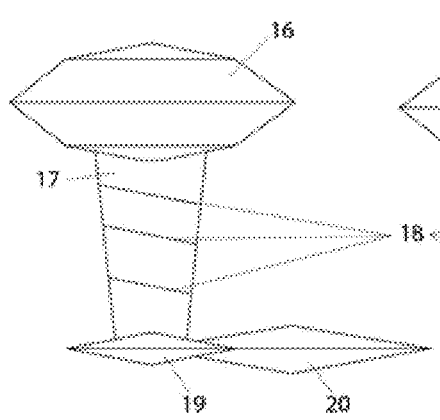
FIG. 5F shows a straight side view of an exemplary embodiment of a hull with hydrofoil system and vibe disk motor where blades are in lifting position, vibe disc in horizontal consistent with the present disclosure.
Figure 5G:
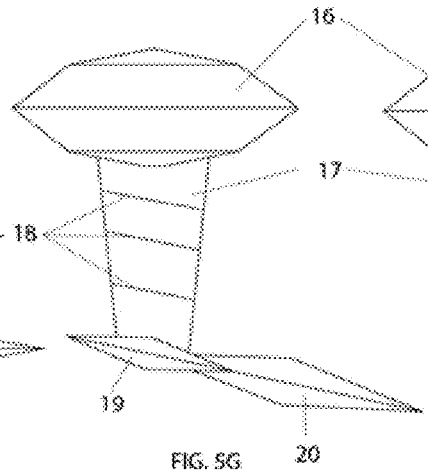
FIG. 5G shows a straight side view of an exemplary embodiment of a hull, hydrofoil and vibe disc motor in lifting position consistent with the present disclosure.
Figure 5H:
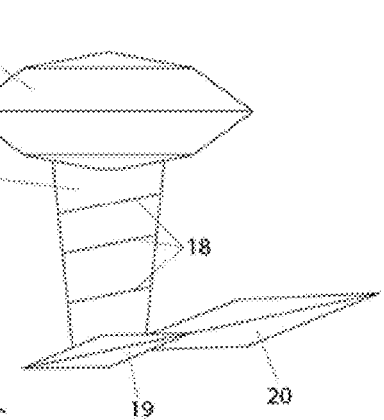
FIG. 5H shows an exemplary embodiment of a hull and hydrofoil vibe disc motor in submersion position consistent with the present disclosure.

FIG. 5A show perspective, FIG. 5B straight side, FIG. 5C straight front view of hull 16 and hydrofoil system 17 including vibe motion disk 19, FIG. 5D shows living space 28 of the hull which can be separated into smaller sections depending on size of the hull, the battery position 29 provides less stress on body structure by close to fulcrum point location, FIG. 5E shows proximate location of hull entrance 22 position towards the platform as well can be located on top of hull, FIG. 5F side straight view of hull and hydrofoil system and vibe motion disk 19 where level blades 18 in lifting position. Vibe motion disk 19 in horizontal position, it allows to keep hulls 16 and platform 14 above water in self balance way on lower speeds submerging level blades 18 to provide enough lift power and on higher speeds using lower pare of level blades 18 due to higher water tension FIG. 5G show hull 16 and hydrofoil 17 with level blades 18 in lifting position, FIG. 5H show hull 16 and hydrofoil 17 with level blades 18, and vibe motion disk 19 in submersion position.

Figure 6A:
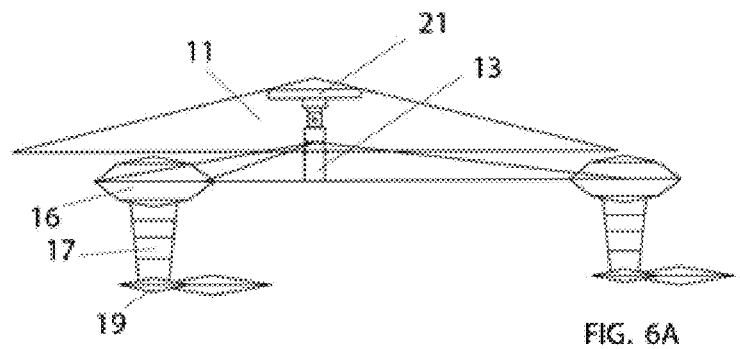
FIG. 6A shows an exemplary embodiment of a side straight with collapsed support arm and horizontal low wind turbine sail position consistent with the present disclosure.
Figure 6B:
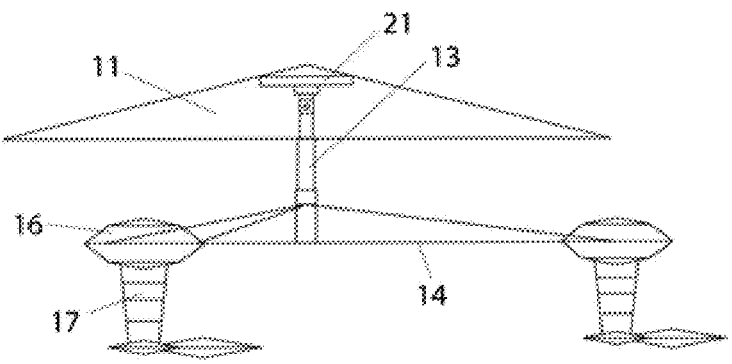
FIG. 6B shows an exemplary embodiment of an expanded support arm and horizontal wind turbine sail consistent with the present disclosure.
Figure 6C:
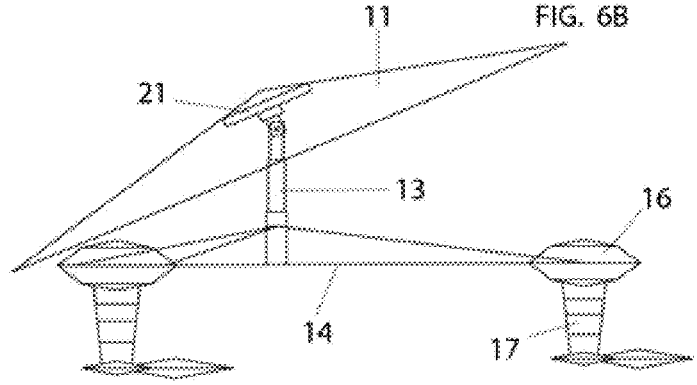
FIG. 6C shows an exemplary embodiment of a side straight with expanded support arm and active wind turbine sail position consistent with the present disclosure.

FIG. 6A side straight view with collapsed support arm 13, and horizontal low position of wind turbine sail 11 position the same as in FIG. 4A, FIG. 4B, FIG. 4C FIG. 6B with expanded support arm 13 and horizontal wind turbine sail 11 allows to provide more space under and prepare for active mode energy can be generated by wind and solar panels. FIG. 6C side straight with expanded support arm 13 and active wind turbine sail 11 position, this position of the wind turbine sail 11 works as sail and generate energy from renewable energy sources.

Figure 6D:
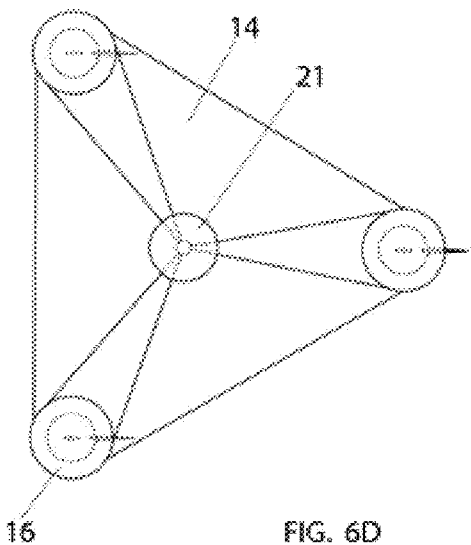
FIG. 6D shows an exemplary embodiment of a straight top base platform with support arm and generator consistent with the present disclosure.
Figure 6E:
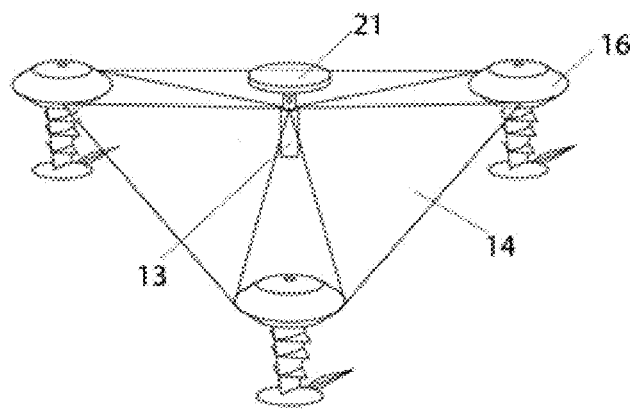
FIG. 6E shows a perspective view of an exemplary embodiment of a base platform and support arm with generator consistent with the present disclosure.

FIG. 6D straight top base platform 14 with support arm 13 and generator 21, shows position of generator 21. FIG. 6E perspective view of base platform 14 and support arm 13 with generator 21. FIG. 7A, FIG. 7B, FIG. 7C, FIG. 7D show rotation cycle of vibe disk motor and interaction between crankshaft electric drive 24 and rudder blade base 27 connected by connecting rod 25.

Regarding FIGS. 1-7, the following Reference Numerals are utilized: 11 Wind turbine sail; 12 wind turbine sail blades; 13 support system (adjustable arm); 14 base platform; 15 hull mount; 16 hull; 17 rudder blade (hydrofoil system); 18 level blades; 19 vibe motion disk; 20 flipper; 21 wind turbine generator; 22 entrants; 23 vibe motion disk drive; 24 crankshaft electric drive; 25 connecting rod; 26 magnet lock; 27 bottom rudder blade attachment; 28 leaving space; 29 battery location.

Operation

A windmill turbine sail 11, its stiff light circular disc structure one side bend in, like umbrella with rotation axis in central part of the wind turbine sail 11, covered by solar panels, a turbine blades 12 located around the edge of the wind turbine 11, with rotation axis located in surface of wind turbine sail 11 and making angel of 45° with radius line on wind turbine sail 11 surface, in central part of the wind turbine sail 11 located electric generator 21.

Wind turbine sail 11 may be mounted on adjustable support arm 13 in whole or in part. In this position, the wind turbine may provide changes and adjustments in height and the angle of the wind turbine sail 11 at any direction. This function is depicted in FIG. 6A FIG. 6B and FIG. 6C. The wind turbine sail may be used as a sail, while generating energy from wind and sun light.

In FIG. 1A to FIG. 1C show wind turbine in passive as sail, horizontal position, and active as horizontal wind turbine generator by fully open wind turbine blades 12 while solar panels fully exposed to sunlight. In FIG. 2A to FIG. 2C wind turbine sail 11 active as sail, as it exposed to wind, wind blades 12 are closed to make size of sail bigger and turn off generation electricity from wind, while getting energy from solar panels placed on wind turbines sail 11.

In FIG. 3A to FIG. 3C show wind turbines sail, active as sail and active as vertical wind turbine generator which, redirects part of the sail wind by half open turbine blades 12, what provide rotation of wind turbine, can be used when sail wind is to strong so extra energy can be used to power vibe motion disks to get better control over the vessel.

In FIG. 4A to FIG. 4C wind turbine sail 11 is in horizontal lower position with wind turbine blades closed to create strong monolithic aerodynamic structure which may help in sailing against the wind or to secure vessels in bad weather from strong winds.

Support arm 13 is mounted to the platform base 14. Telescopic arm with adjustable angle generator head 21, can provide variety of angles and heights position levels as shown in FIG. 6A to FIG. 6C. Platform 14 is supported by hulls 16. 3 or more hulls 16 Hulls are attached around the edge, creating equal distance between center of the base 14, and one or more hulls creating equal angels between hull and center of the platform 14, equally supporting vessel, inflatable platform support is located on platform base 14 next to hull mount 15. Wide located fulcrum points provide strong steady structure and needed support to wind turbine sail. Hulls 16 are aerodynamic UFO shape with entrance 22 on top half side facing to platform FIG. 5E. Hulls meant to provide floating of the platform 14 above the water level when vessel is not moving or speed is slow. As well hulls provide living and storage space which can be separated in smaller levels or cabins if size is big enough, as well hulls are covered with solar panels which make hulls more sustainable in case of separation from platform 14.

One or more hulls in bottom center attached by magnet lock 26 to hydrofoil system 17, magnetic lock 26 prevents from damaging of attachment, in case of collision disconnect rudder blade to avoid damage of vessel, it allows to reconnect parts again by pooling connective safety cord which prevents it from drowning.

Hydrofoil system consists of rudder blade 17 with vertical axis of rotation, which defines direction of the movement and allows to change direction immediately without turning the vessel. On sides of rudder blade attached level blades 18 with horizontal axis of rotation perpendicular to rudder blade 17 and direction of movement.

Level blades 18 have variety of angles which can generate lift or submersion power in order to balance vessel. At the bottom part of the rudder blade attachment 27 connects to vibe motion disk 19 with horizontal axis of rotation with attached flipper 20 in back part of disk. Structures create short movements clock wise and backward, the vibration movement of disc 19 is meant to transmit to flipper 20 which creates similar to fish tail movement in water which provides movement of the vessel, can be used together with level blades 18, as it have disc shape to generate more powerful lift or submersion by changing the angle and by activation of the vibe motion disk 19 flipper to provide movement as it shown on FIG. 5F, FIG. 5G, FIG. 5H in order to balance vessel and keep hulls 16 together with platform 14 above water level while movement, eliminating water drag of the hulls. In self balancing condition FIG. 5F where vibe motion disk 19 in horizontal position and level blades 18 in lifting position it allows to keep hulls 16 and platform above water in self balance way without continual adjustments of level blades 18 angle on lower speeds submerging level blades 18 to provide enough lift power and on higher speeds using lower pare of level blades 18 due to higher water tension.

Vibe motion disk can comprise an aerodynamic disk hull with crankshaft electric drive 24 connected by connecting rod 25 to bottom rudder blade attachment 27, structure use crankshaft electric drive to transform rotating of the electric motors to provide short opposite direction movement which are transferred to flipper to provide similar to fish tail movements and provide motion in water.

One of the advantages of the structure can include aerodynamic shape with less water drag comparing to regular propeller shape which increases water drag. Other benefits of vibe motion disk include more environmentally friendly and quiet. The vessel is a combination of technical solutions which can be used together or separated, such as wind turbine sail, omni direct platform with hydrofoil system, and vibe motion disk. The structure can be made of light strong materials such as carbon fiber compounds and the likeness thereof. This may be done to portions of the structure or the structure in its entirety.

There are many alternative ways the vessel can be made, it depends on purpose of use. It can be used for sport sailing, travel, research, cargo carrying or human less drone for monitoring international waters, do rescue operations or can be part of marine cloud brightening unit to reduce climate changing.

Wind turbine sail can be used on other multihull ships or used separate from the vessel to generate energy from wind and solar dismissing sail purpose.

In order to reduce costs of production possible dismissing of some of the elements of the vessel. Wind turbine sail could be made without solar panels or ability to generate electricity from the wind, or completely replaced with solar panels. Elements of hydrofoil system like rudder blade, vibe motion disk can be used on any other vessel.

Quantity of the hulls can be increased including one in central part of the platform, hulls can be inseparable with vessel. The vessel can be made without hulls, just platform supported by pontoon and hydrofoil systems directly to the platform without hulls.

Platform can have ability to change size distance between center of platform and hulls, increasing size make more stable decreasing size makes structure strong and compact.

Preferably, many elements should be kept in order to achieve high performance and effectiveness of the vessel as well as making it completely green and sustainable.

Figure 8:
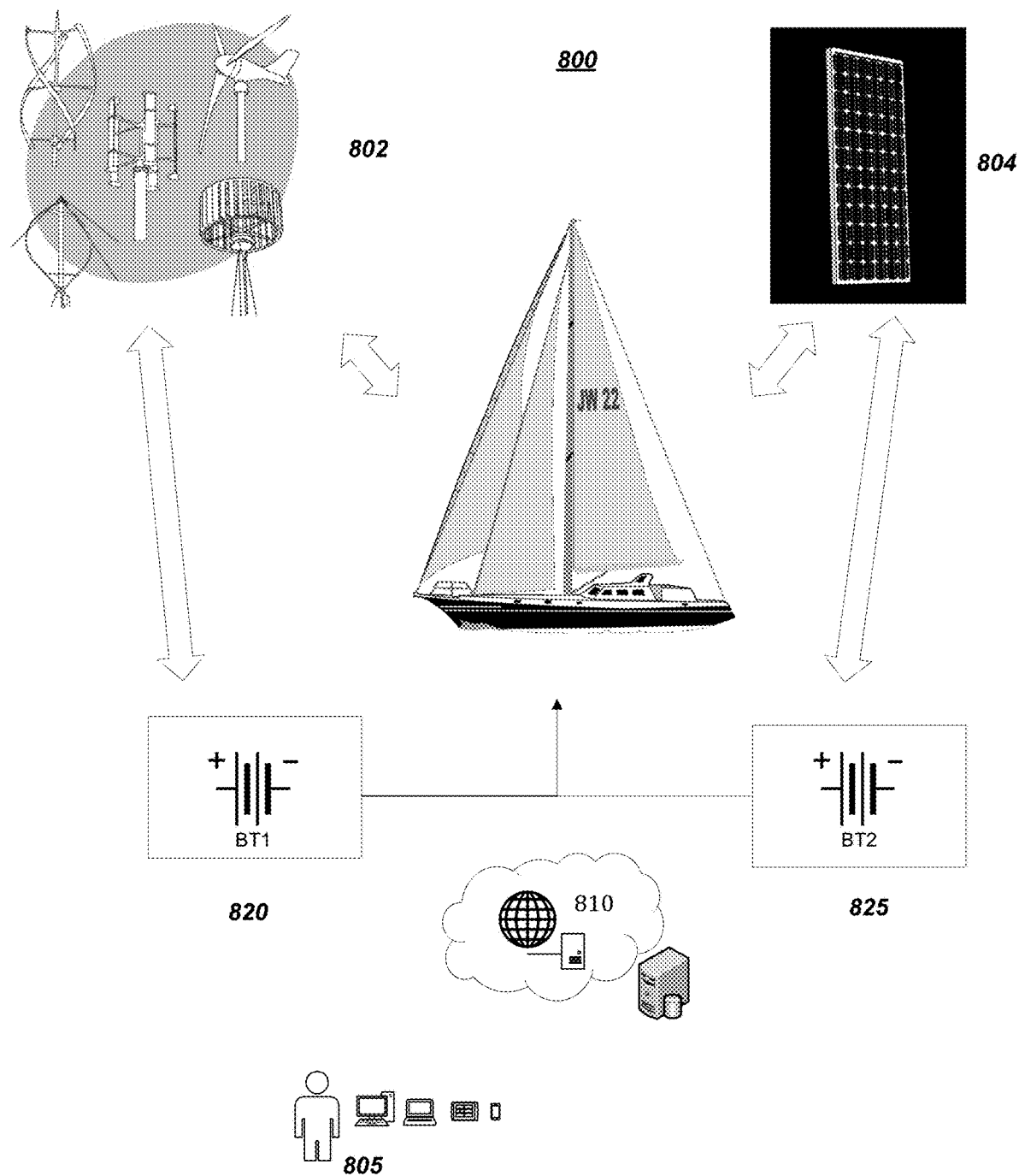
FIG. 8 shows an exemplary embodiment of an operating environment of the marine vessel comprising a sail, wind turbines, solar panels, and batteries consistent with the present disclosure.
Figure 9:
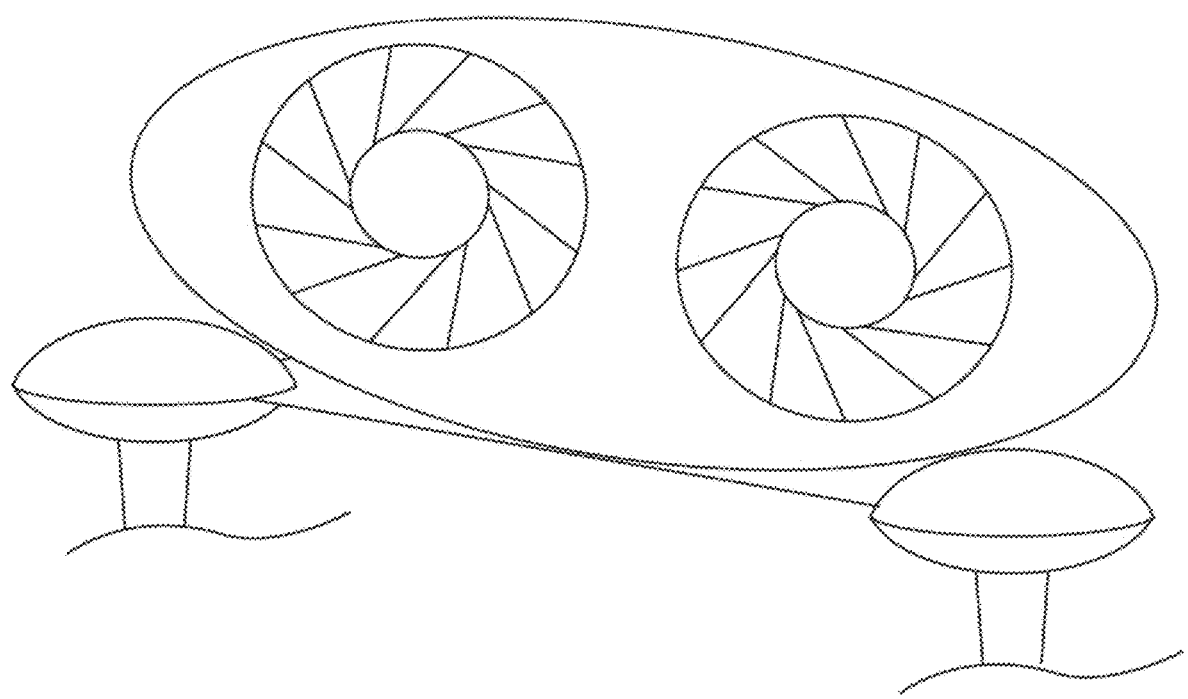
FIG. 9 shows perspective view of an exemplary embodiment of a vessel with a sail in active position, where sail has two parallel wind turbines, build in surface of the sail, wind turbines act like horizontal wind turbines.

FIG. 8 shows combination if renewable energy sources including wind turbine and solar panels which provide energy to power electric propulsion system, store in batteries, control and adjustment systems of the vessel, including sail position wind turbine blades, hydrofoil system, navigation and autopilot system FIG. 9 shows perspective view of the vessel with a sail in active position, where sail has two parallel wind turbines, build in surface of the sail, wind turbines act like horizontal wind turbines.

Figure 10:
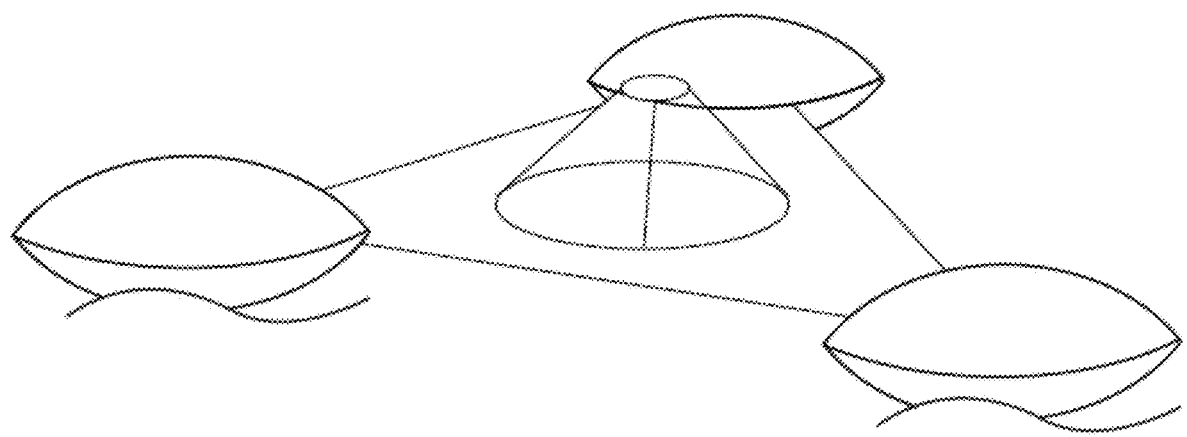
FIG. 10 shows perspective view of an exemplary embodiment of a platform with three hulls around it and one build in the platform with support system for the sail.

FIG. 10 shows perspective view of the platform with three hulls around it and one build in the platform with support system for the sail.

Figure 11:
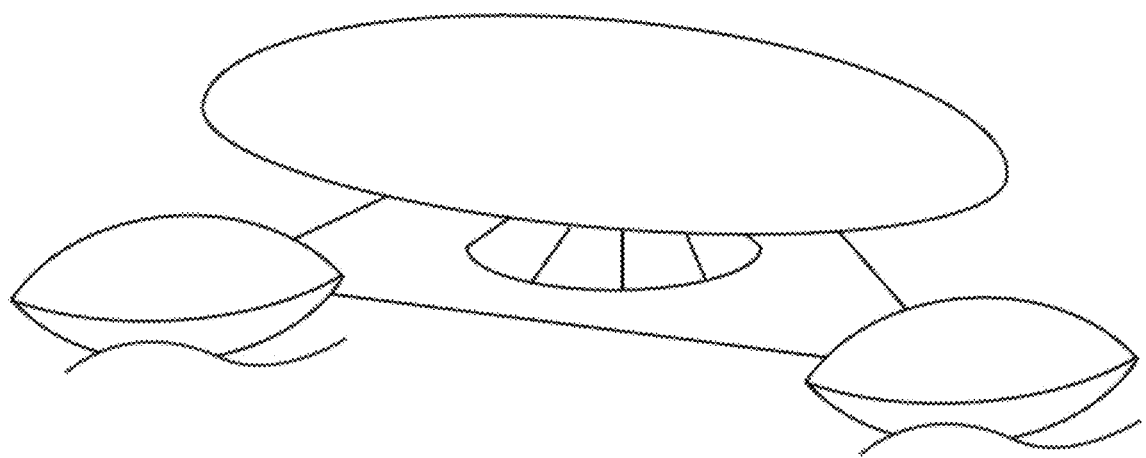
FIG. 11 perspective view of an exemplary embodiment of a vessel with solar stiff sail in passive position.

FIG. 11 perspective view of the vessel with solar stiff sail in passive position.

Figure 12:
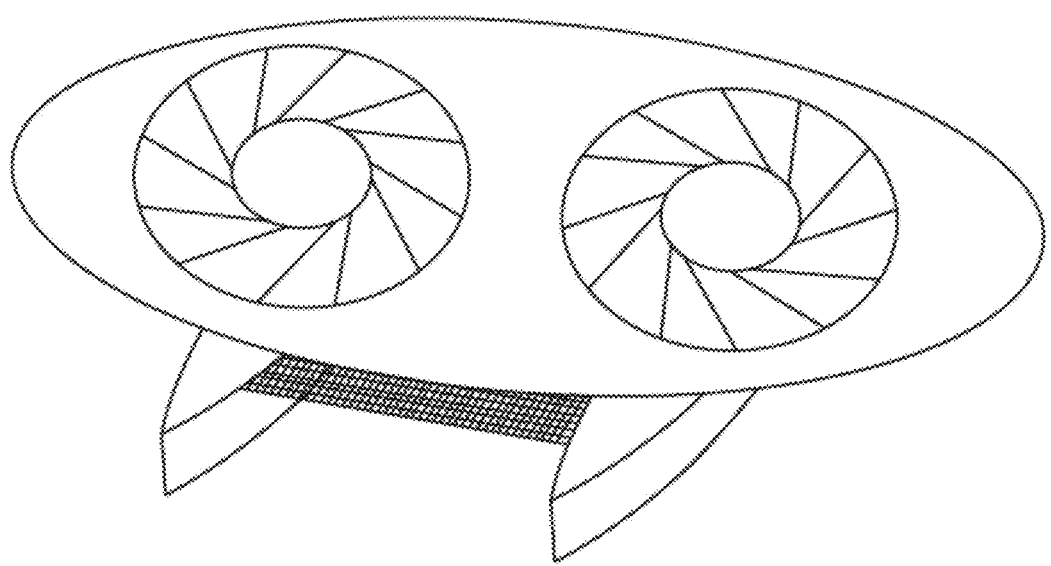
FIG. 12 shows perspective view of an exemplary embodiment of a catamaran with active wind turbine solar sail.

FIG. 12 shows perspective view of catamaran with active wind turbine solar sail.

Figure 13:
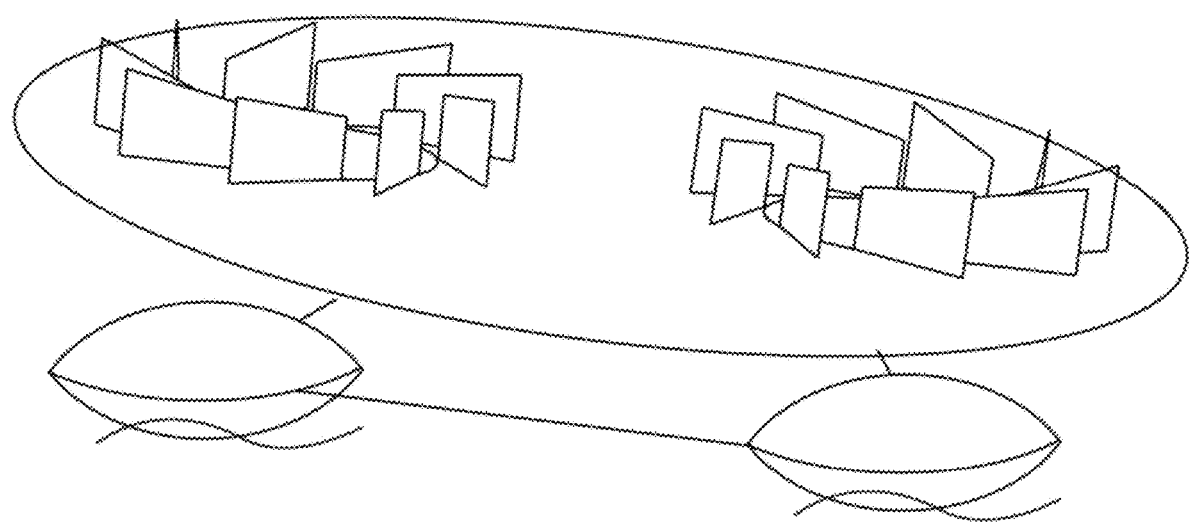
FIG. 13 shows perspective view of an exemplary embodiment of a vessel with a sail in passive position, and wind turbine in active position act as vertical wind turbine.

FIG. 13 shows perspective view of the vessel with a sail in passive position, and wind turbine in active position act as vertical wind turbine.

Figure 14:
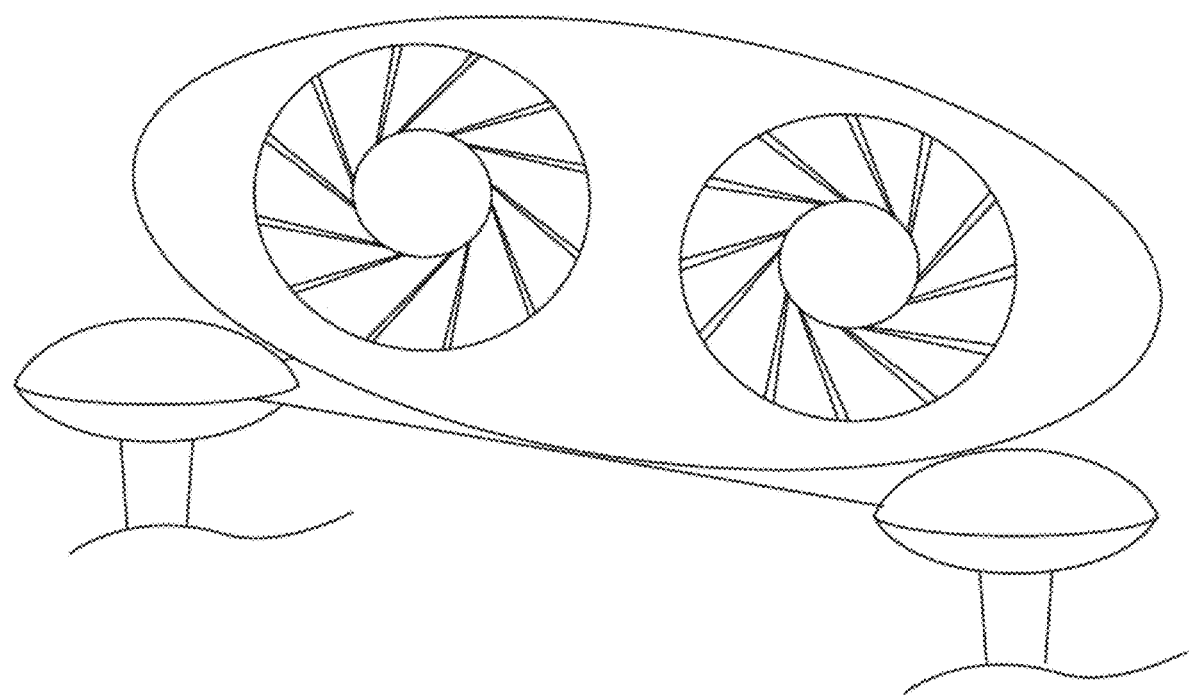
FIG. 14 shows perspective view of an exemplary embodiment of a vessel with a sail in active position, wherein sail has two parallel wind turbines, build in surface of the sail, wind turbines act like horizontal wind turbines.

FIG. 14 shows perspective view of the vessel with a sail in active position, wherein sail has two parallel wind turbines, build in surface of the sail, wind turbines act like horizontal wind turbines.

Figure 15:
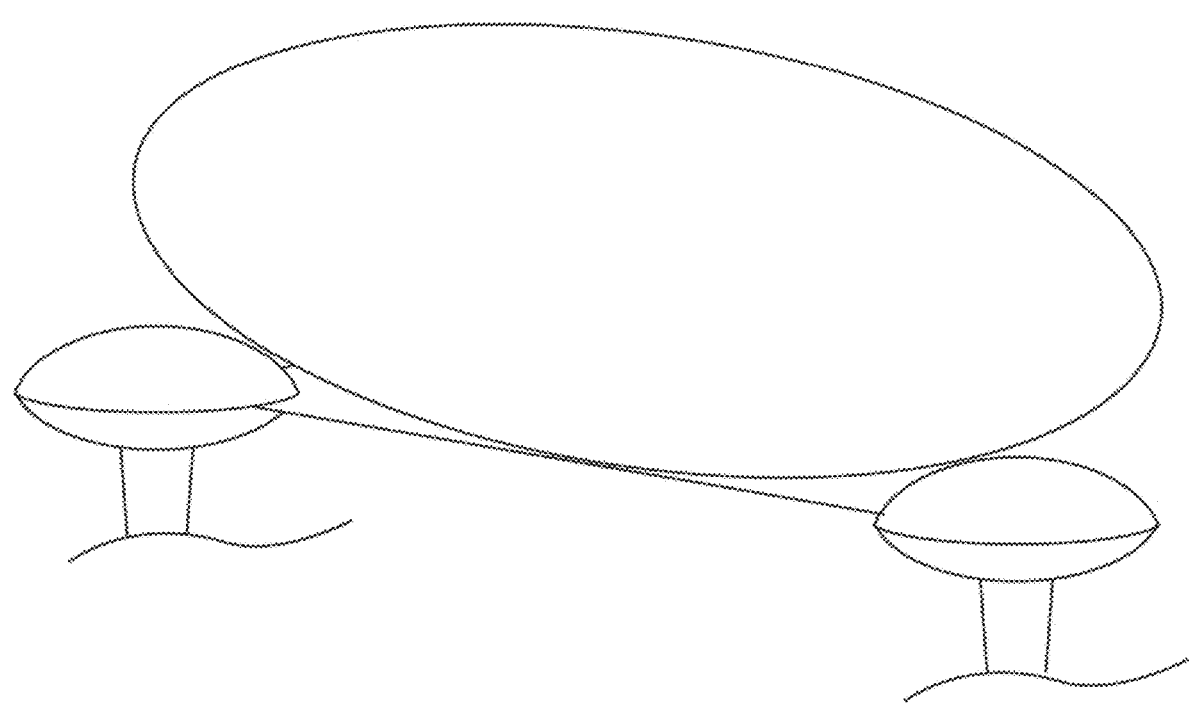
FIG. 15 shows perspective view of an exemplary embodiment of a vessel with a solar sail in active position.

FIG. 15 shows perspective view of the vessel with a solar sail in active position.

Figure 16:
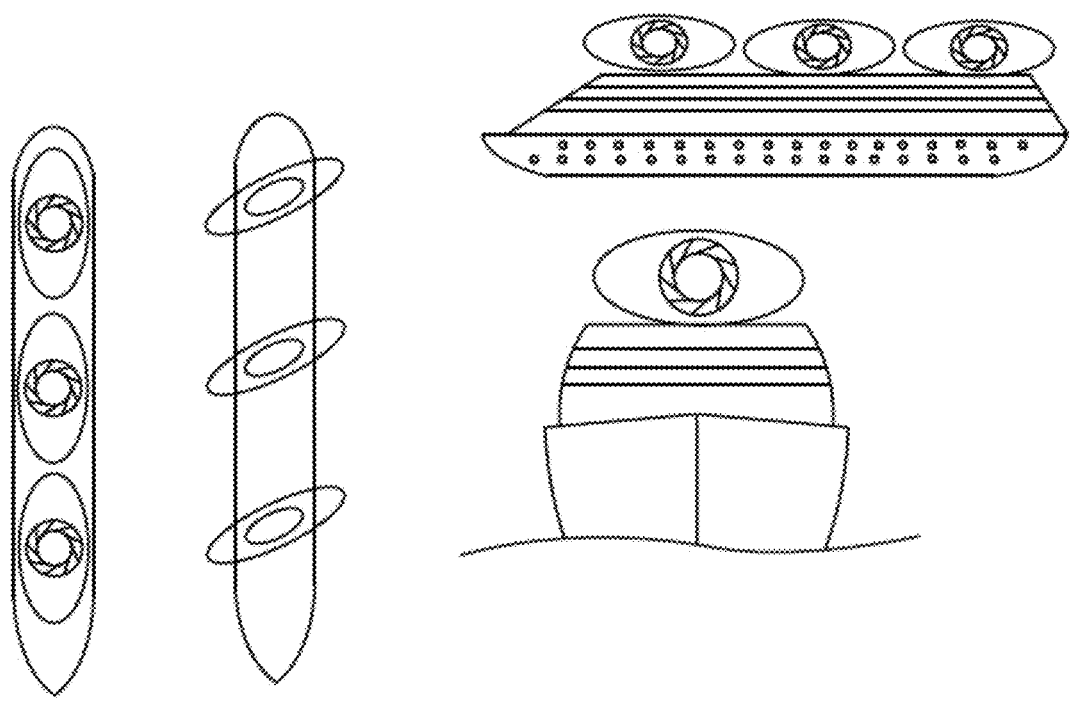
FIG. 16 shows top side and front of an exemplary embodiment of a ship with multiple wind turbine solar sail located on top of the vessel.

FIG. 16 shows top side and front of ship with multiple wind turbine solar sail located on top of the vessel.

Figure 17:
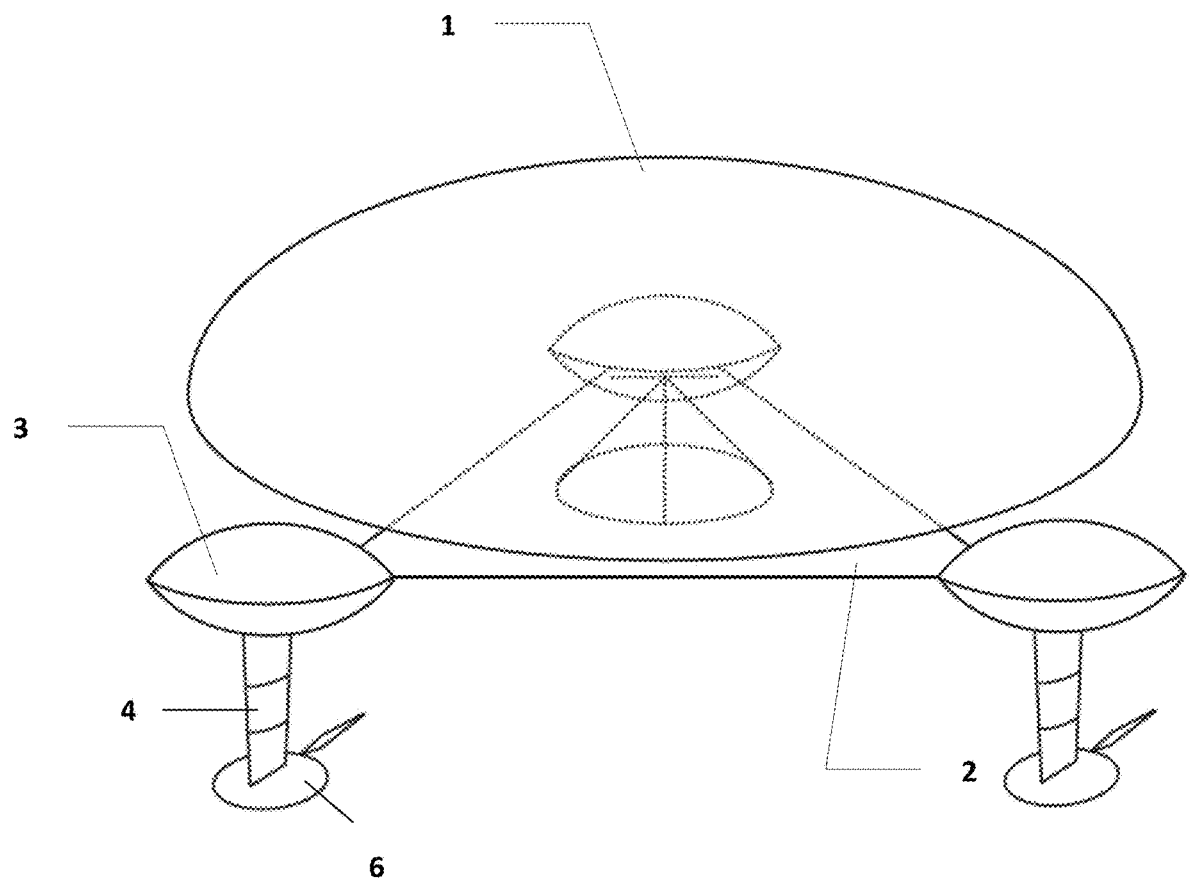
FIG. 17 shows a perspective view of an exemplary embodiment of a vessel with active sail position consistent with the present disclosure.

FIG. 17 shows a perspective view of the vessel with active sail position consistent with the present disclosure.

Figure 18:
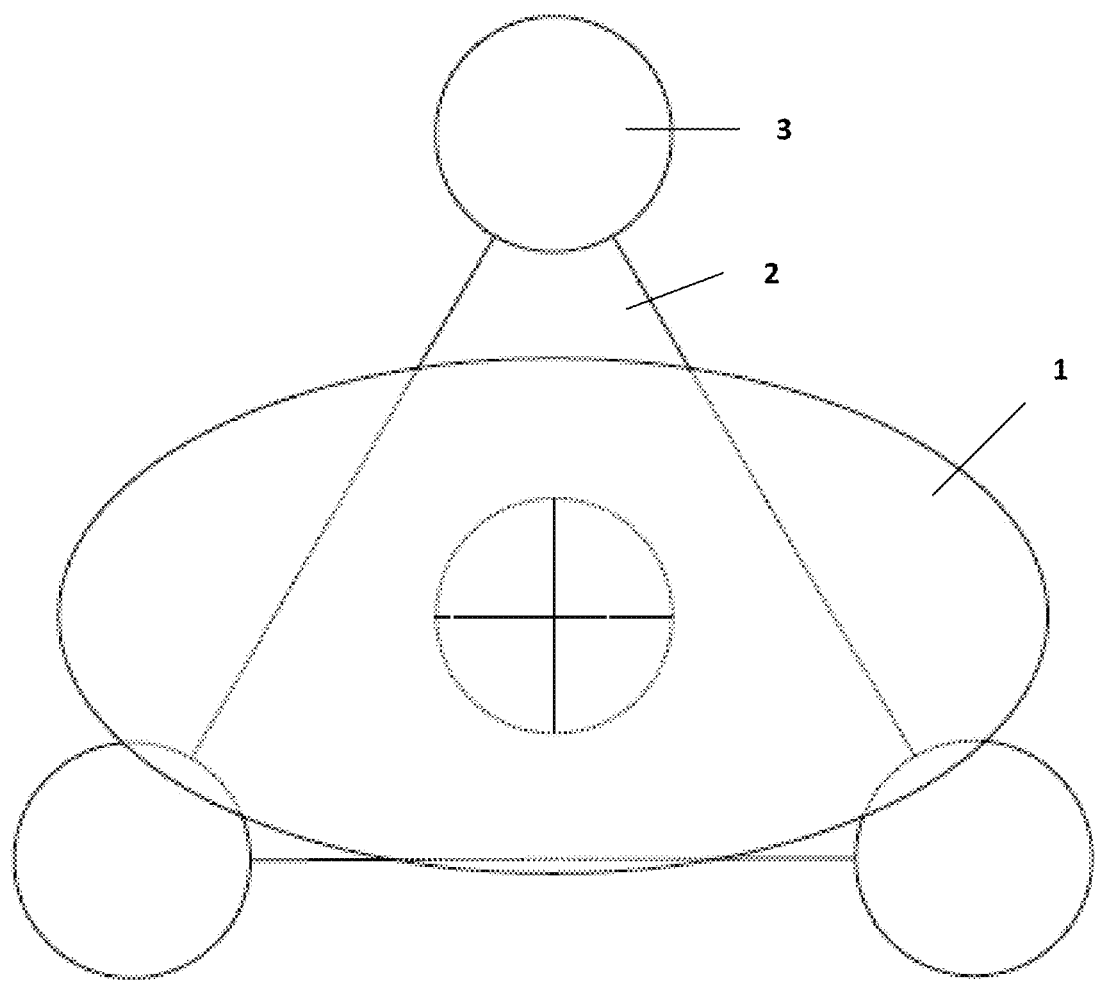
FIG. 18 shows a top view of an exemplary embodiment of a vessel with active sail position consistent with the present disclosure.

FIG. 18 shows a top view of the vessel with active sail position consistent with the present disclosure.

Figure 19:
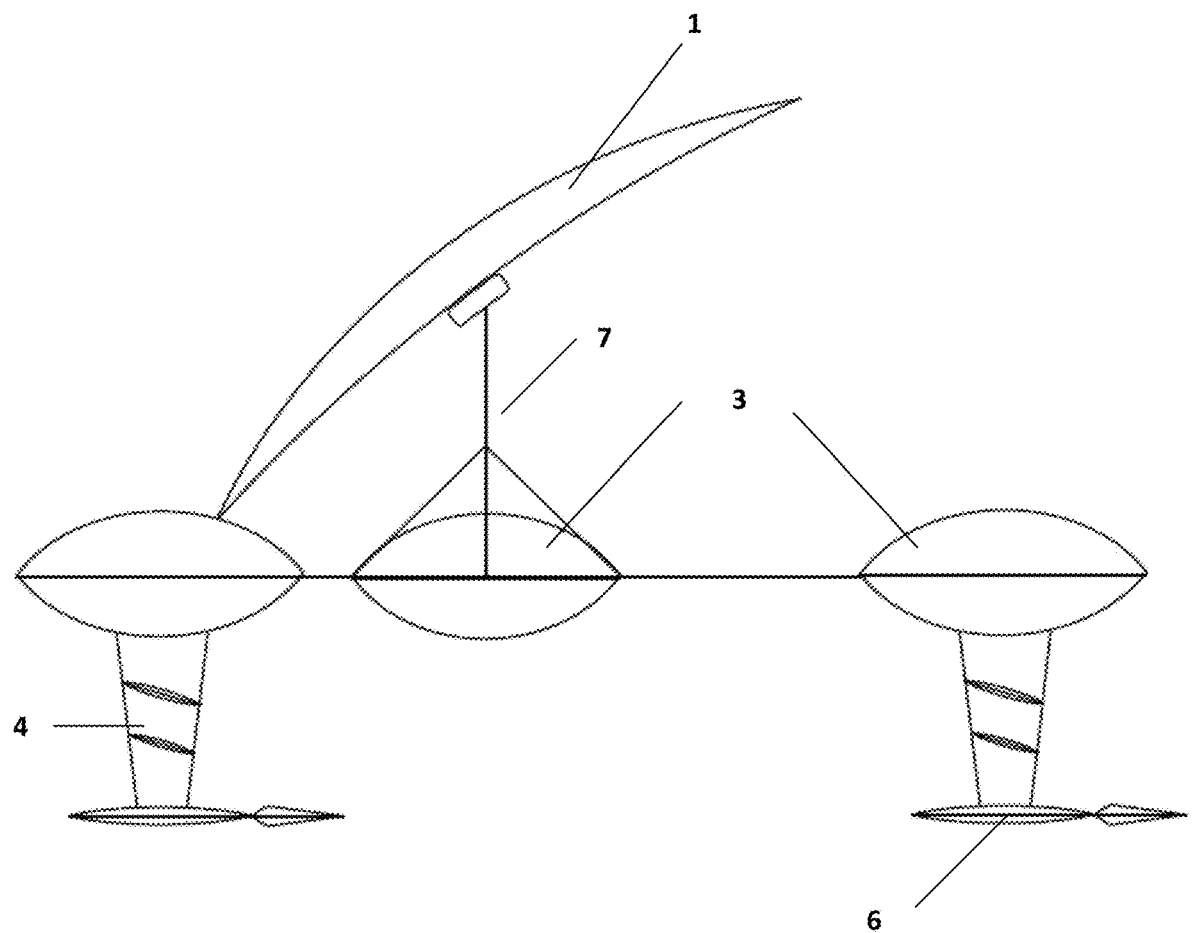
FIG. 19 shows a side view of an exemplary embodiment of a vessel with active sail position consistent with the present disclosure.

FIG. 19 shows a side view of the vessel with active sail position consistent with the present disclosure.

Figure 20:
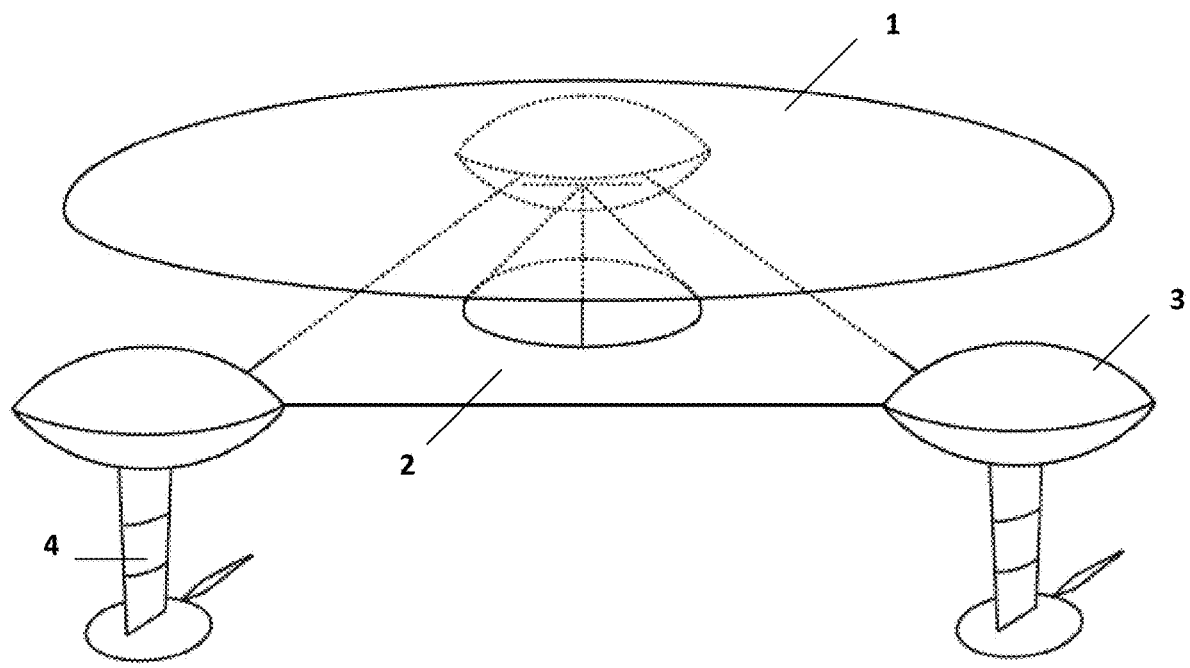
FIG. 20 shows a perspective view of an exemplary embodiment of a vessel with sail in passive horizontal position consistent with the present disclosure.

FIG. 20 shows a perspective view of the vessel with sail in passive horizontal position consistent with the present disclosure.

Figure 21:
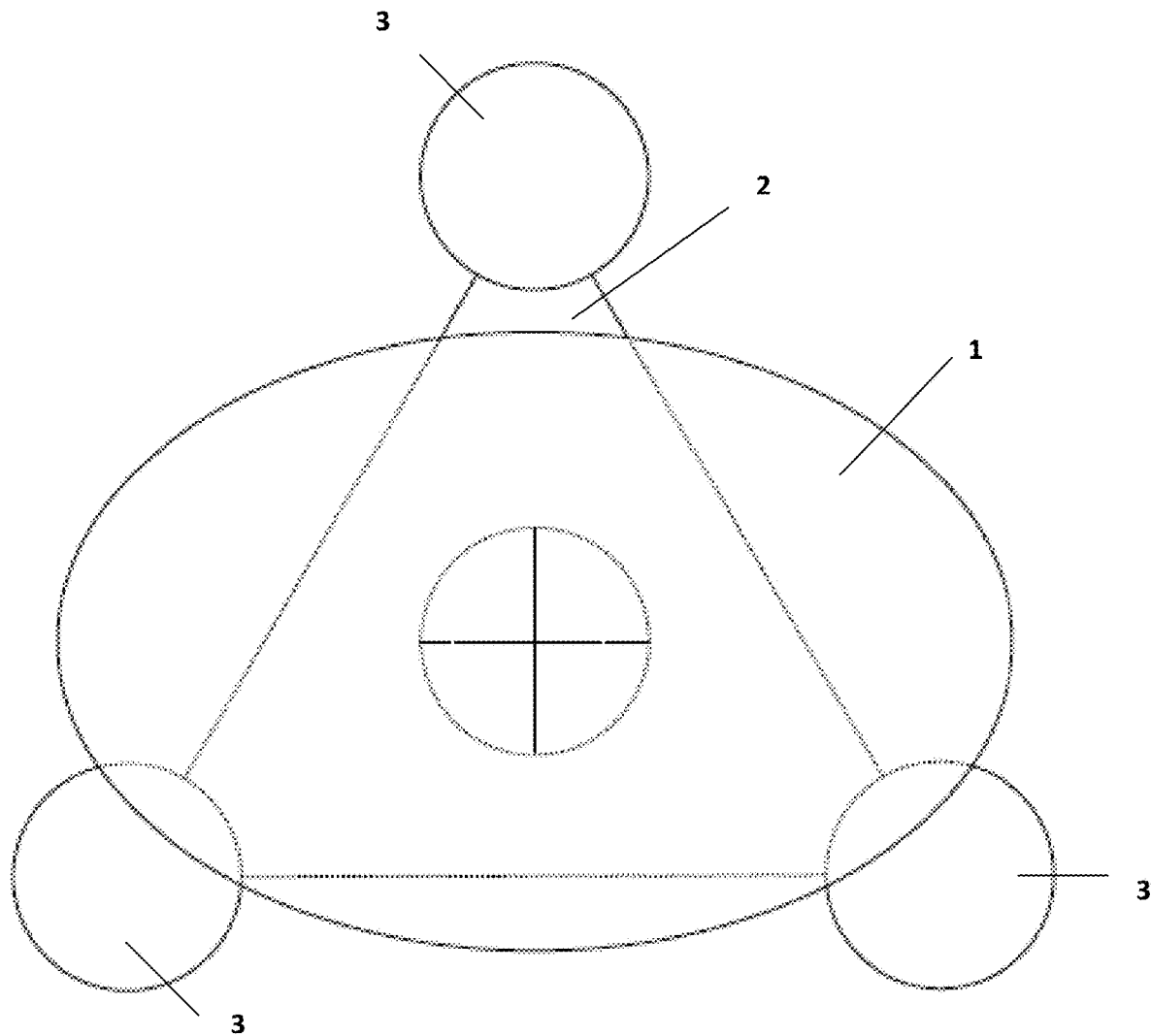
FIG. 21 shows a top view of an exemplary embodiment of a vessel with sail in passive horizontal position consistent with the present disclosure.

FIG. 21 shows a top view of the vessel with sail in passive horizontal position consistent with the present disclosure.

Figure 22:
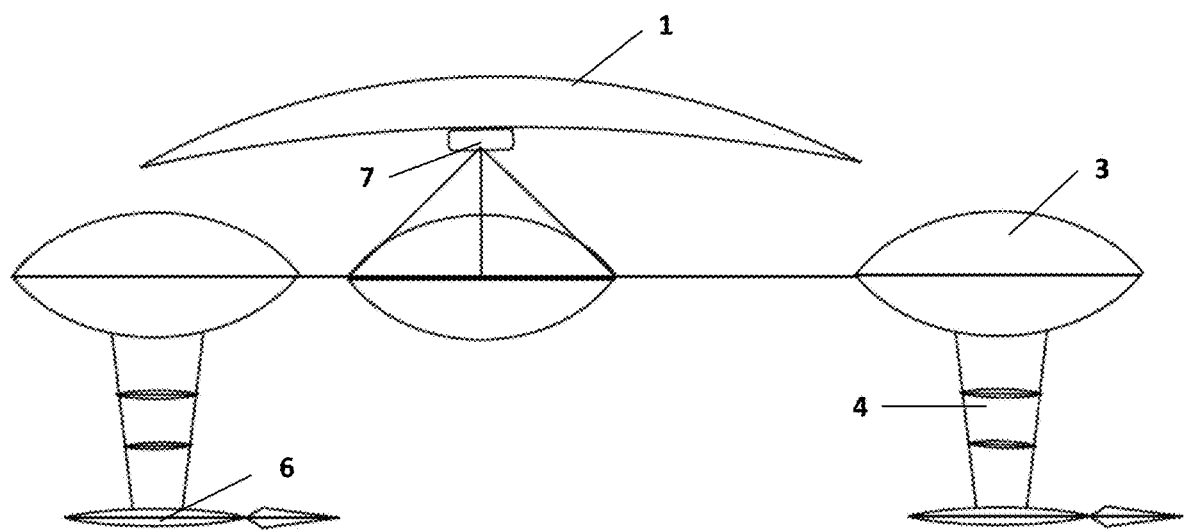
FIG. 22 shows a side view of an exemplary embodiment of a vessel with sail in passive horizontal position consistent with the present disclosure.

FIG. 22 shows a side view of the vessel with sail in passive horizontal position consistent with the present disclosure.

Figure 23:
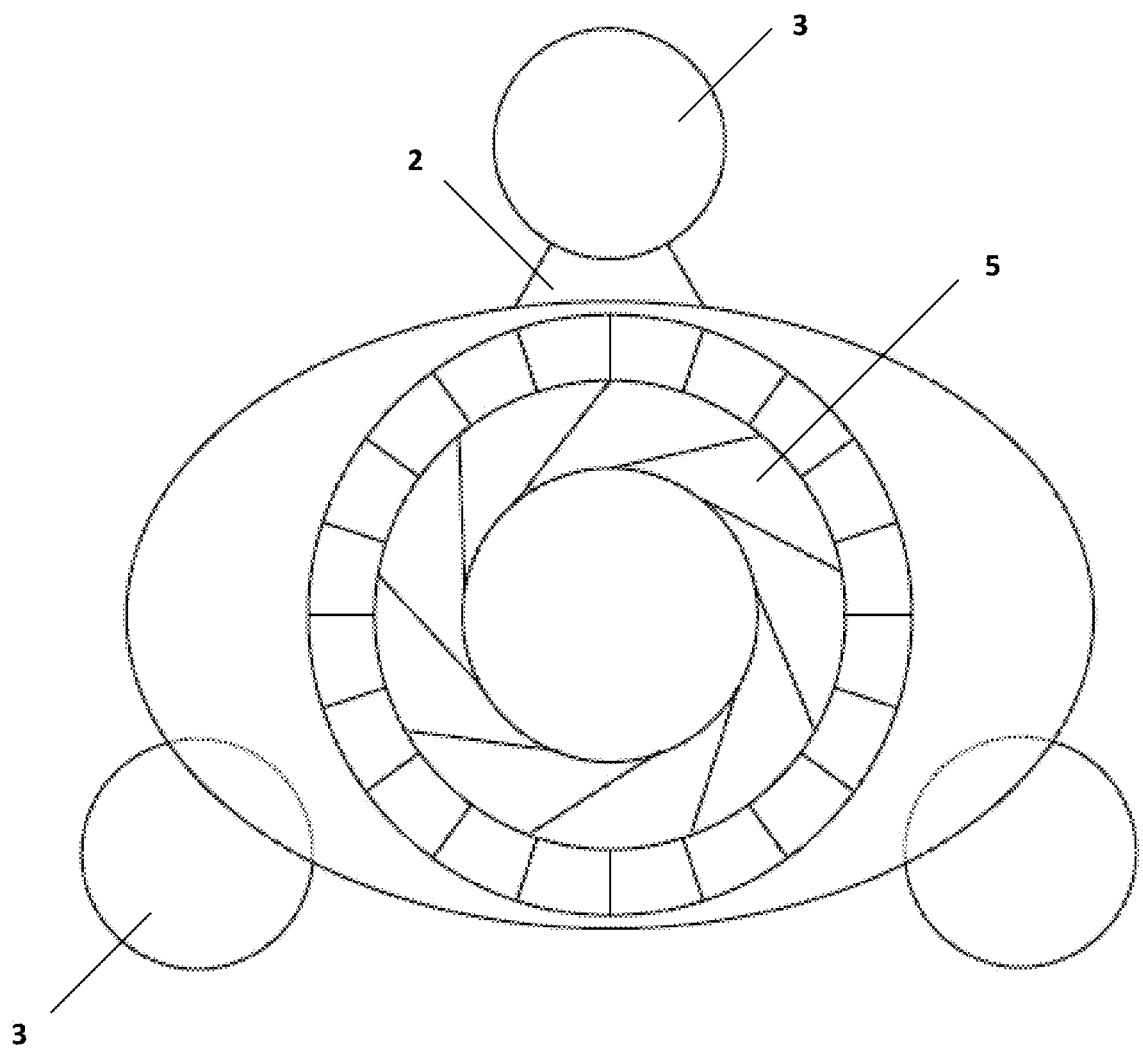
FIG. 23 shows a top view of an exemplary embodiment of a vessel with wind turbine solar sail in passive horizontal position and active vertical wind turbine consistent with the present disclosure.

FIG. 23 shows a top view of the vessel with wind turbine solar sail in passive horizontal position and active vertical wind turbine consistent with the present disclosure.

Figure 24:
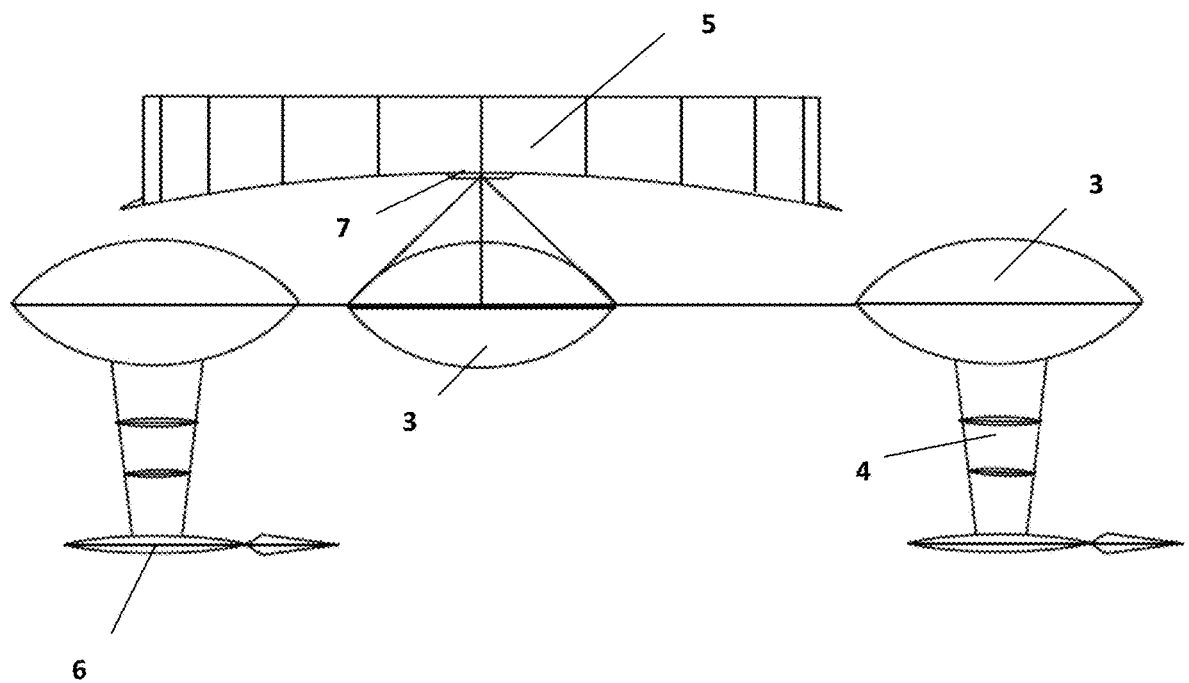
FIG. 24 shows a side view of an exemplary embodiment of a vessel with wind turbine solar sail in passive horizontal position and active vertical wind turbine consistent with the present disclosure.

FIG. 24 shows a side view of the vessel with wind turbine solar sail in passive horizontal position and active vertical wind turbine consistent with the present disclosure.

Figure 25:
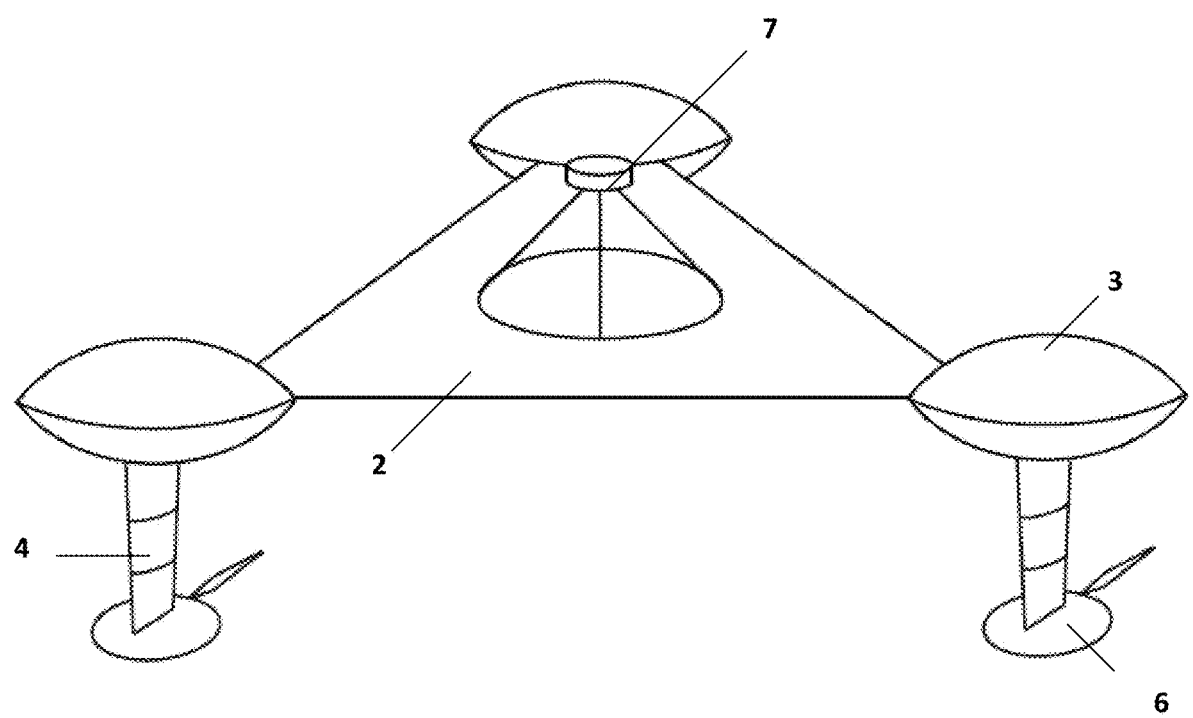
FIG. 25 shows a perspective view of an exemplary embodiment of a vessel platform with sail support structure (no sail) consistent with the present disclosure.

FIG. 25 shows a perspective view of vessel platform with sail support structure (no sail) consistent with the present disclosure.

Figure 26:
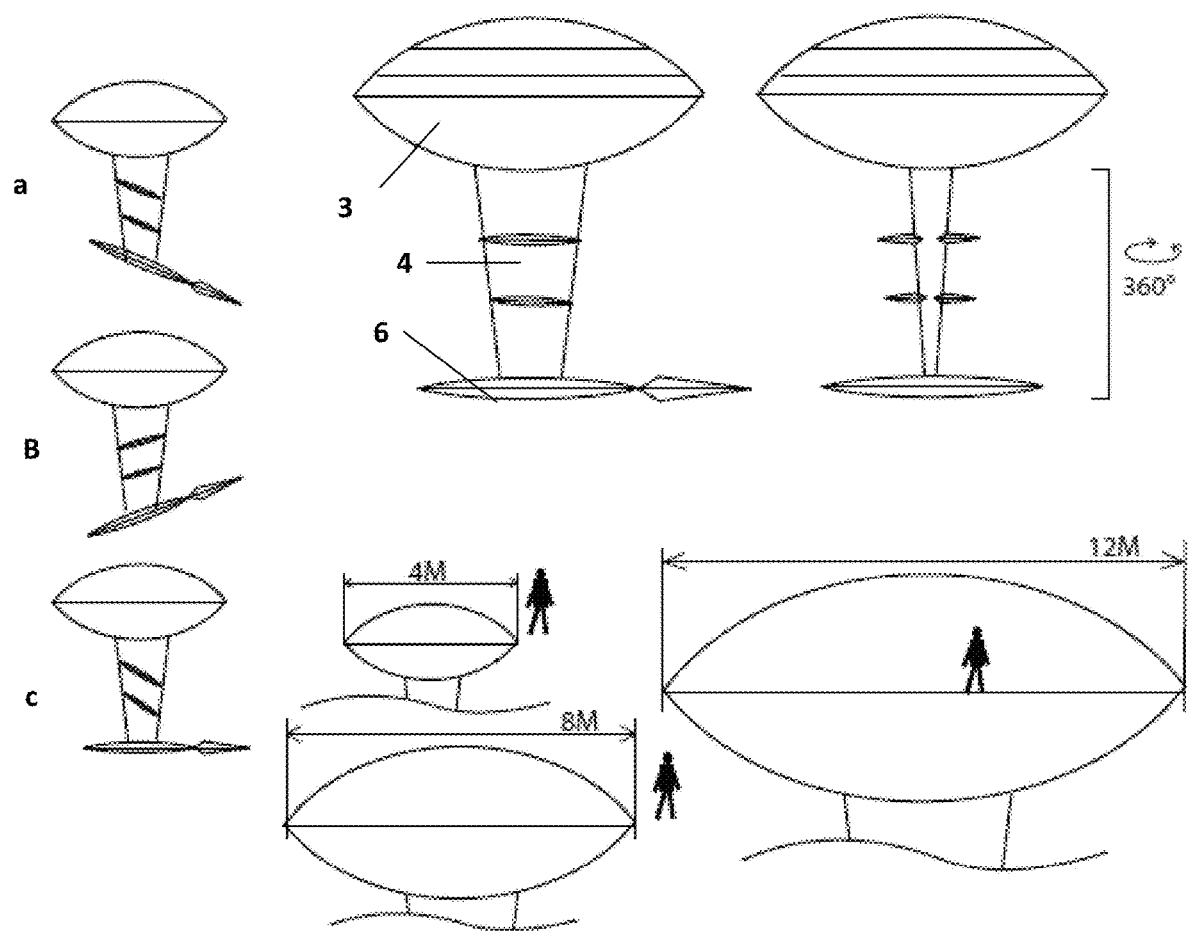
FIG. 26 show hulls proportions and combinations of an exemplary embodiment of hydrofoil blades positions (a—lift, b—submersion, c—auto) consistent with the present disclosure.

FIG. 26 show hulls proportions and combinations of hydrofoil blades positions (a—lift, b—submersion, c—auto) consistent with the present disclosure.

Figure 27:
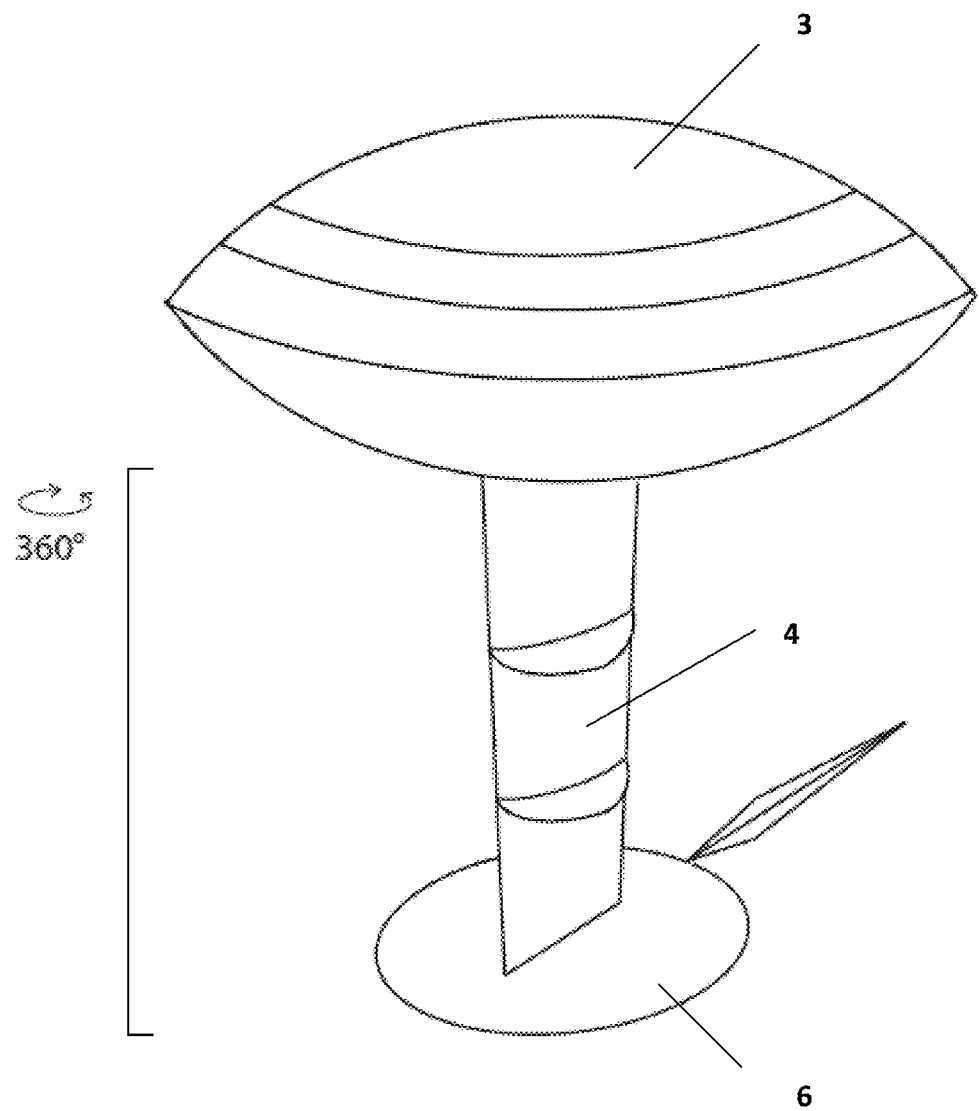
FIG. 27 shows a perspective view of an exemplary embodiment of a hull with hydrofoil consistent with the present disclosure.

FIG. 27 shows a perspective view of hull with hydrofoil consistent with the present disclosure.

Figure 28:
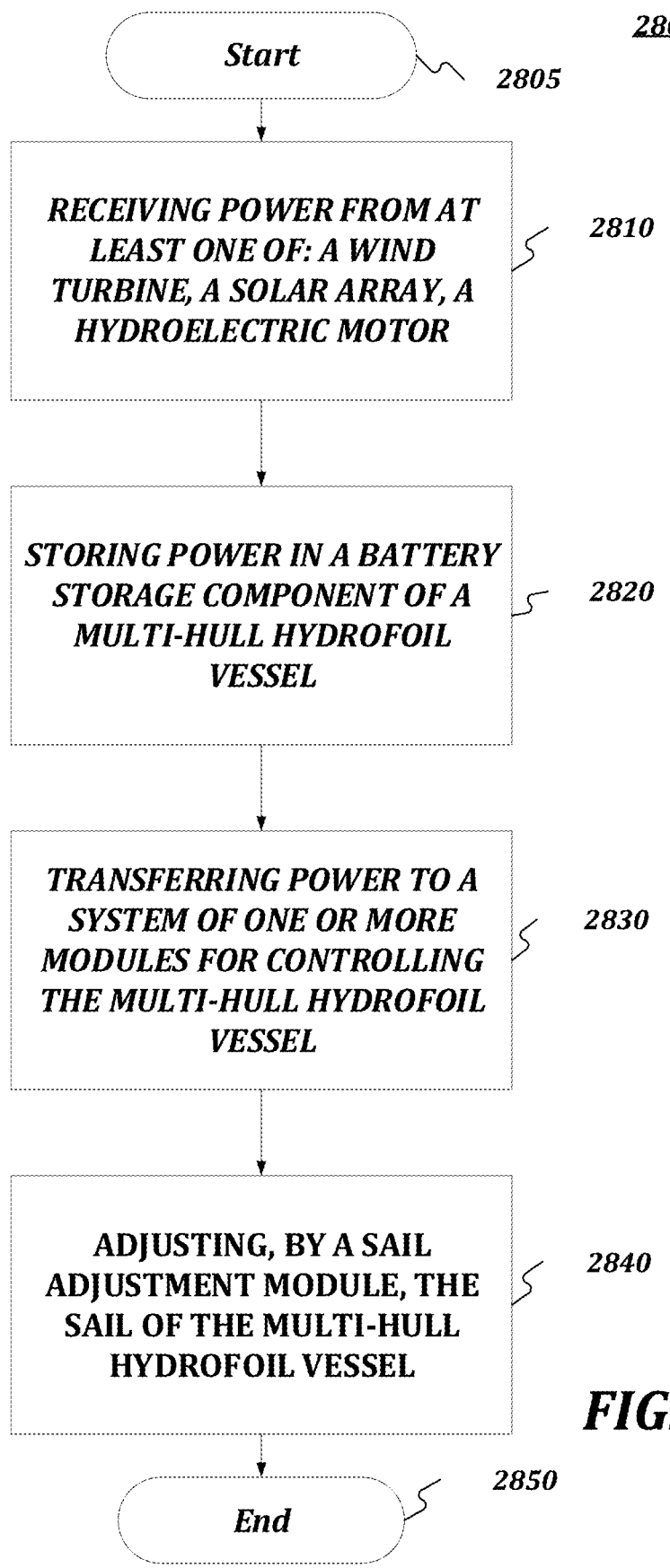
FIG. 28 is a flow chart of a method for providing OMNI DIRECT MODULAR MULTI-HULL HYDROFOIL VESSEL INTEGRATED WITH RENEWABLE-ENERGY SOURCES consistent with the present disclosure.
Figure 29:
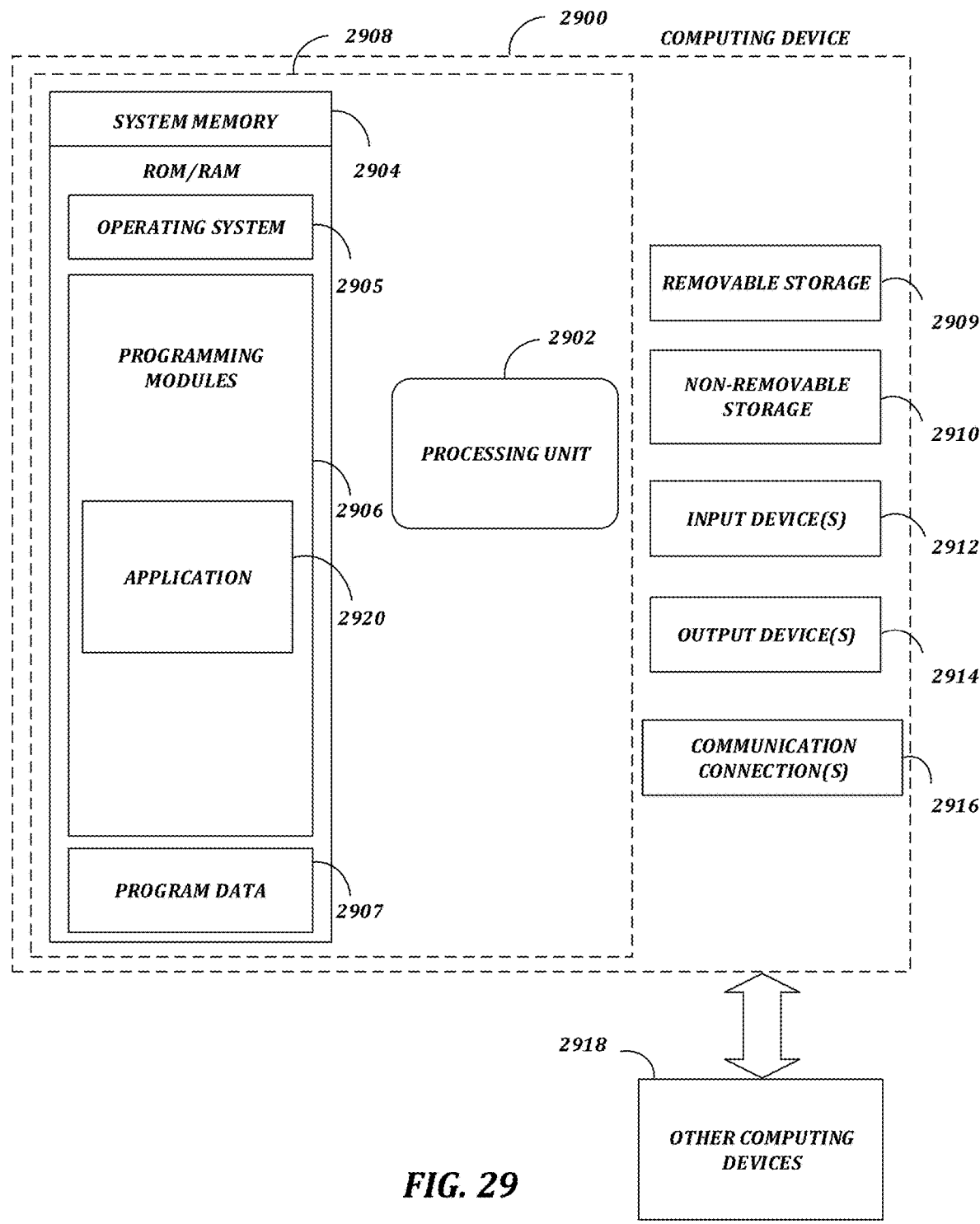
FIG. 29 is a block diagram of an exemplary embodiment of a system including a computing device for performing the method of FIG. 28 consistent with the present disclosure.

FIG. 28 is a flow chart of a method for providing OMNI DIRECT MODULAR MULTI-HULL HYDROFOIL VESSEL INTEGRATED WITH RENEWABLE-ENERGY SOURCES consistent with the present disclosure; and FIG. 29 is a block diagram of a system including a computing device for performing the method of FIG. 28 consistent with the present disclosure.

Regarding FIGS. 17-27, the following Reference Numerals are utilized: 1 solar stiff sail; 2 platform; 3 hull; 4 hydrofoil; 5 wind turbine solar sail; 6 vibe motor disk (hydrofoil propulsion); 7 adjustable support system for sail.

I. Hydrofoil Overview

Consistent with embodiments of the present disclosure, a OMNI DIRECT MODULAR MULTI-HULL HYDROFOIL VESSEL INTEGRATED WITH RENEWABLE-ENERGY SOURCES may be provided. This overview is provided to introduce a selection of concepts in a simplified form that are further described below. This overview is not intended to identify key features or essential features of the claimed subject matter. Nor is this overview intended to be used to limit the claimed subject matter's scope. The OMNI DIRECT MODULAR MULTI-HULL HYDROFOIL VESSEL INTEGRATED WITH RENEWABLE-ENERGY SOURCES may be used by individuals or companies to for more energy efficient and superior maritime travel.

Problems with Modern Hydrofoil Vessels

Many modern sail yachts experience careening and instability in the water due to the shape and positioning of the sail in relation to the centralized fulcrum of the vessel. Such poorly designed vessels slow down ships and additional drag in water environment Shape and structure of the most modern ships can't provide enough space for placing renewable sources of energy to sustain the vessel. Modern ships especially with big monolithic structure are not safety enough because one hole can cause loss of the entire vessel, body doesn't have independent modules which can be separated and able to operate autonomously or be replaced with temporary part to support vessel floating balance. Production of the ships is consisting of big monolithic structure with a lot of different parts which make production difficult, more time consuming, and expansive. Modern vessels especially sail yachts are not easy to control which often requires a crew of sailors. Maneuverability of the modern ships often lack control over rapid change of direction of the movement or breaking speed down, in water environment.

Advantages of the Present Disclosure

Omni directional hydrofoil vessel structure provides the following technological advantages.

1 hydrofoil structure has low water drag and improved control over direction on high speed (rudder blades can rotate 360 degrees, and define direction of the movement, allowing change direction without turning vessel, and sail).

2 omnidirectional structure allows to support bigger sail or more powerful renewable energy sources.

3 more stable structure help to prevent flipping over on higher speed.

4 weight separation is more equal, create less stress on structure.

5 hulls have omni-directional aerodynamic shape (keep aerodynamic performance on same level in all directions). Solar stiff sail (oval shape stiff wing made from light strong composite materials, covered with solar panels, mounted on adjustable support system, which provide 360' rotation, variety of angles and heights, located in center of platform).

1 generate energy from solar panels located on sail suffice.

2 stiff sail easy to control (no need crew to operate). create propulsion and lift at the same time.

3 can serve as weather shield for deck between hulls.

Wind turbine solar sail is combination of solar stiff sail and build in hybrid wind turbine (which combines vertical and horizontal wind turbine functions, and change between them by adjusting angles of the wind turbine blades, and sail position).

1 can generate electricity from wind in active sail position function as horizontal wind turbine.

2 in horizontal position of the sail act as vertical wind turbine, generate electricity in passive state 3 produce energy from solar panels located sail suffice.

4 improve control over the vessel by transforming part of wind energy to electricity and directing it to hydrofoil propulsion.

5 create propulsion and lift of the vessel at the same time.

6 can serve as weather shield for deck between hulls.

Vibe motion disk (hydrofoil propulsion system which consist of aerodynamic disk and flexible flipper mounted in beck part of it, creates propulsion by transferring vibrations from disk to flipper, what creates familiar to fish tail movements).

1 reduce water drag.

2 friendlier to nature environment.

The present disclosure provides a new type of structure which allows to sail extremely fast and utilizing renewable energy at high efficient level, combined with omni directional hydrofoil system with high level of control, harmless for environment organically shaped, logic design provide high level potential in performing compared to previous structure which lacking maneuverability and efficiency. In bigger scale can be alternative to sustainable house.

A computer readable medium comprising, but not limited to, at least one of the following:

a memory;

a processor;

a controller;

a display;

a GUI; and at least one of: An adjustment module, a sail adjustment module, a user interface module, a GPS navigation module, a visual navigation module, a gyro compass module, a power management module, a radar module, a magnetic compass module, an auto pilot module, an automatic radar plotting aid module, an automatic tracking aid module, a metrics module (speed, distance, rate of turn, etc.), an echo sounder module, an electronic chart display module, a long range tracking and identification module, a rudder angle module, a data recorder module, a sight and sound module (ship whistle, forecastle bell, sound reception, navigational lighting, signaling lamp, etc.), a pilot module, a voyage history module, and other modules used to provide navigation an propulsion functions for the hydrofoil vessel having one or more hulls.

Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

Various hardware components may be used at the various stages of operations follow the method and computer-readable medium claims. For example, although the methods have been described to be performed by a computing device, it should be understood that, in some embodiments, different operations may be performed by different networked elements in operative communication with the computing device. For example, server 810 and/or computing device 2900 may be employed in the performance of some or all of the stages disclosed with regard to the methods claimed below. Similarly, apparatus 805 may be employed in the performance of some or all of the stages of the methods. As such, apparatus 805 may comprise at least those architectural components as found in computing device 2900.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Finally, the claims are not structured in the same way non-provisional claims are structured. For example, indentations indicate optional/dependent elements of a parent element.

A system comprising:

a hydrofoil vessel comprising one or more hulls, an omni-directional platform connecting the one or more hulls of the hydrofoil vessel; and wherein the omni-directional platform further comprises at least one of:

a sail, a wind turbine, a solar panel, a hydroelectric motor;

a hydrofoil controller platform; and a battery component.

A method comprising:

receiving, by a hydrofoil controller platform, power from at least one of: a wind turbine, a solar array, a hydroelectric motor;

storing, by a hydrofoil controller platform, power in a battery component of a hydrofoil vessel;

transferring power to a system of one or modules configured to control the hydrofoil vessel; and adjusting at least one of:

a sail, a wind turbine blade, a hydrofoil system, a navigation system an autopilot system.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Hydrofoil System Configuration

FIG. 8 illustrates one possible operating environment through which a Hydrofoil System consistent with embodiments of the present disclosure may be provided. By way of non-limiting example, a hydrofoil system 800 may be hosted on a centralized server 810, such as, for example, a cloud computing service. A user 805 may access platform 800 through a software application. The software application may be embodied as, for example, but not be limited to, a website, a web application, a desktop application, and a mobile application compatible with a computing device 2900. One possible embodiment of the software application may be provided by a suite of products and services.

As will be detailed with reference to FIG. 29 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

FIGS. 1C, 2C, 3C, 8, 19, 20, 22, 24, and 25 illustrate non-limiting examples of operating environments for the aforementioned modules. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

I. Embodiments of the Present Disclosure Provide a Software and Hardware Platform Comprised of a Distributed Set of Modules, Including, but not Limited to:

An adjustment module, a sail adjustment module, a user interface module, a GPS navigation module, a visual navigation module, a gyro compass module, a power management module, a radar module, a magnetic compass module, an auto pilot module.

In some embodiments, the present disclosure may provide an additional set of modules for further facilitating the software and hardware platform. The additional set of modules may comprise, but not be limited to:

An automatic radar a plotting aid module, an automatic tracking aid module, a metrics module (speed, distance, rate of turn, etc.), an echo sounder module, an electronic chart display module, a long range tracking and identification module, a rudder angle module, a data recorder module, a sight and sound module (ship whistle, forecastle bell, sound reception, navigational lighting, signaling lamp, etc.), a pilot module, a voyage history module.

II. Embodiments of the Present Disclosure Provide a Software and Hardware Platform Comprised of a Distributed Set of Computing Elements, Including, but not Limited to:

A. A Computing Device

The computing device comprising, but not limited to at least one of the following:
A processing unit,
A memory storage,
Wherein the computing device may be embodied as a mobile computing device,
  wherein the mobile computing device comprises, but is not limited to,
    A tablet,
    A smartphone,
    A drone,
    A wearable camera,
    A handheld camera,
    An installed camera, and
    A remotely operable recording device;
Wherein the computing device may comprise sensing devices,
  wherein the sensing device may comprise, but is not limited to,
    A camera, and
    A microphone; and
Wherein the computing device may be in communication with sensing devices, wherein the sensing devices provide telemetry data associated with the computing device;

Wherein the computing device may be embodied as any of the computing elements illustrated in FIG. 8 and FIG. 29, including, but not limited to, Content Generation Module 125, Content Organization Module 145, Content Display Module 155; and Content Transmission/Presentation Module 135.

B. Sub-Modules Associated with the Computing Device Platform may be operative to control at least one of the following sub-modules of a computing device:
  A user interface module,
  A content capturing module,
  A timing module,
  A location module,
  An orientation module, and
  A communications module.

1. The User Interface Module
  a. Enables user-control of the Computing Device
  b. Enables user-control of the Sub-Modules of the Computing Device
    i. The user interface module
    ii. The content capturing module
    iii. The timing module
    iv. The location module
    v. The communications module
  c. Enables user-control of the Platform Modules:
    i. The content generation module
    ii. The content transmission module
    iii. The content organization module
    iv. The content display module 2. The Content Capturing Module
  a. Enables operative control of content recordation hardware
    i. Sensing Device
      1. Optical Sensors
      2. Audio Sensors
      3. Telemetry Sensors
      4. GPS Sensors
      5. Power Sensors
  b. Enables capturing based on data:
    i. Recordation of content received from the communications module
    ii. Recordation of content displayed on the computing device (e.g., screen capture)
  c. Enables Digital Signal Processing on captured content:
    i. Enables Content Stitching based on, but not limited to, spatial parameters and temporal parameters
    ii. Enables image processing techniques such as, but not limited to, image stabilization.

3. The Timing Module
  a. Operative control of a clock associated with the computing device
  b. In operative communication with a central clock
  c. Time stamps content captured by the content capturing module
  d. Used for syncing various content streams 4. The Location Module
  a. Enables the reading and communicating of location data associated with a sensing device;
  b. The location data may be obtained by way of, for example, but not limited to:
    i. GPS/IP Address/Triangulation
    ii. LAN/WAN
    iii. SONAR/RADAR
    iv. Navigation Data
    v. Nautical Data
    vi. Geographic Data 5. The Communications Module
  a. Enables the networking of the multiple content capture modules associated with multiple networked devices
  b. In operative communication with other communications modules of computing devices capturing content
  c. Configured to communicate with nearby devices also running on the platform d. Configured to join 'groups' of devices capturing content under a similar 'location/theme/etc'
e. Remote control of the capturing modules
f. Remote control of the camera
g. Remote control of the microphone
h. Via Wireless Media
i. Via Wired Media Various hardware components may be used at the various stages of operations follow the method and computer-readable medium. For example, although the methods have been described to be performed by a computing device, it should be understood that, in some embodiments, different operations may be performed by different networked elements in operative communication with the computing device. For example, server 810 and/or computing device 2900 may be employed in the performance of some or all of the stages disclosed with regard to the methods below.

III. Embodiments of the Present Disclosure Provide a Hardware and Software Platform Operative by a Set of Methods and Computer-Readable Media Comprising Instructions Configured to Operate the Aforementioned Modules and Computing Elements in Accordance with the Methods:

The methods and computer-readable media may comprise a set of instructions which when executed are configured to enable a method for inter-operating at least one of the following modules:

A. Content Generation Module;
B. Content Transmission Module;
C. Content Organization Module; and
D. Content Display Module The aforementioned modules may be inter-operated to perform a method comprising the following stages:

1. receiving, by a hydrofoil controller platform, power from at least one of: a wind turbine, a solar array, a hydroelectric motor;
2. storing, by a hydrofoil controller platform, power in a battery component of a hydrofoil vessel;
3. transferring power to a system of one or modules configured to control the hydrofoil vessel; and
4. adjusting at least one of:
   a sail,
   a wind turbine blade,
   a hydrofoil system,
   a navigation system
   an autopilot system.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Embodiments of the Present Disclosure Provide a Hardware and Software Platform Operative as a Distributed System of Modules and Computing Elements.

A. Display Module

Providing a plurality of presentation views and consumption in the user interface module;

Wherein providing the plurality of presentation views for presentation and consumption comprises:

Displaying a visual representation of the data streams associated with the data processed by the hydrofoil controller platform and associated modules, Sub-Organization of Content Streams within the Presentation View wherein visual representation is organized based on:
Efficiency of power generated
Amount of power stored
Orientation data
Location Data
GPS Data
Navigation Data
Nautical Data
Various other metadata wherein grouping the presentation views into the at least one view further comprises:
Analyzing the metadata associated with each of the grouped information for orientation data, and
displaying the data to the user.

III. Hydrofoil Controller Platform Operation

FIG. 28 is a flow chart setting forth the general stages involved in a method 2800 consistent with an embodiment of the disclosure for providing hydrofoil controller platform 800. Method 2800 may be implemented using a computing device 2900 as described in more detail below with respect to FIG. 29.

Although method 2800 has been described to be performed by computing device 2900, it should be understood that, in some embodiments, different operations may be performed by different networked elements in operative communication with computing device 2900. For example, server 810 and/or computing device 2900 may be employed in the performance of some or all of the stages in method 2800. Moreover, server 810 may be configured much like computing device 2900 and, in some instances, be one and the same embodiment. Similarly, apparatus as depicted in FIGS. 1C, 2C, 3C, 19, 20, 22, 24, and 25 may be employed in the performance of some or all of the stages in method 2800. Apparatus as depicted in FIGS. 1C, 2C, 3C, 19, 20, 22, 24, and 25 may also be configured to be operated by a controller much like computing device 2900.

Although method 2800 has been described to be performed by hydrofoil controller platform 800, it should be understood that computing device 2900 may be used to perform the various stages of method 2800. Furthermore, in some embodiments, different operations may be performed by different networked elements in operative communication with computing device 2900. For example, server 810 may be employed in the performance of some or all of the stages in method 2800. Moreover, server 810 may be configured much like computing device 2900. Similarly, apparatus depicted in FIG. 1 may be employed in the performance of some or all of the stages in method 2800. Apparatus as depicted in FIGS. 1C, 2C, 3C, 19, 20, 22, 24, and 25 may also be configured to be operated by a controller much like computing device 2900.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 2800 will be described in greater detail below.

Method 2800 may begin at starting block 2805 and proceed to stage 2810 where computing device 2900 may receive power from at least one of: a wind turbine, a solar array, a hydroelectric motor.

From stage 2810, where computing device 2900 receives power from at least one of: a wind turbine, a solar array, a hydroelectric motor, method 2800 may advance to stage 2820 where computing device 2900 may store power in a battery storage component of a multi-hull hydrofoil vessel. For example, power may be stored in a lithium ion, lead acid, saltwater, or other type of battery cell located on the multi-hull hydrofoil vessel.

Once computing device 2900 store power in a battery storage component of a multi-hull hydrofoil vessel in stage 2820, method 2800 may continue to stage 2830 where computing device 2900 may transfer power to a system of one or more controllers and modules for controlling the multi-hull hydrofoil vessel. For example, an embodiment of the disclosure in terms of computing device 2900, programming modules 2906 may include but are not limited to (e.g., sail adjustment module, user interface module, GPS navigation module, visual navigation module, gyro compass module, power management module, radar module, magnetic compass module, auto pilot module, automatic radar plotting aid module, automatic tracking aid module, metrics module (speed, distance, rate of turn, etc.), echo sounder module, electronic chart display module, long range tracking and identification module, rudder angle module, data recorder module, sight and sound module (ship whistle, forecastle bell, sound reception, navigational lighting, signaling lamp, etc.), pilot module, voyage history module, propulsion system module, application 2920).

After computing device 2900 transfer power to a system of one or more controllers and modules for controlling the multi-hull hydrofoil vessel in stage 2830, method 2800 may proceed to stage 2840 where computing device 2900 may adjust using an adjustment module at least one of: a wind turbine blade, a hydrofoil system, a navigation system, and an autopilot system of the multi-hull hydrofoil vessel. For example, sail may be dynamically adjusted without a crew by powering the module which controls the sail system. Once computing device 2900 adjusts using an adjustment module at least one of: a wind turbine blade, a hydrofoil system, a navigation system, and an autopilot system of the multi-hull hydrofoil vessel in stage 2840, method 2800 may then end at stage 2850.

IV. Computing Device Architecture

The hydrofoil computing platform 800 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the hydrofoil computing platform 800 may be hosted on a centralized server, such as, for example, a cloud computing service. Although method 2800 has been described to be performed by a computing device 2900, it should be understood that, in some embodiments, different operations may be performed by different networked elements in operative communication with computing device 2900.

Embodiments of the present disclosure may comprise a system having a memory storage and a processing unit. The processing unit coupled to the memory storage, wherein the processing unit is configured to perform the stages of method 2800.

FIG. 29 is a block diagram of a system including computing device 2900. Consistent with an embodiment of the disclosure, the aforementioned memory storage and processing unit may be implemented in a computing device, such as computing device 2900 of FIG. 29. Any suitable combination of hardware, software, or firmware may be used to implement the memory storage and processing unit. For example, the memory storage and processing unit may be implemented with computing device 2900 or any of other computing devices 2918, in combination with computing device 2900. The aforementioned system, device, and processors are examples and other systems, devices, and processors may comprise the aforementioned memory storage and processing unit, consistent with embodiments of the disclosure.

With reference to FIG. 29, a system consistent with an embodiment of the disclosure may include a computing device, such as computing device 2900. In a basic configuration, computing device 2900 may include at least one processing unit 2902 and a system memory 2904. Depending on the configuration and type of computing device, system memory 2904 may comprise, but is not limited to, volatile (e.g. random access memory (RAM)), nonvolatile (e.g. read-only memory (ROM)), flash memory, or any combination. System memory 2904 may include operating system 2905, one or more programming modules 2906, and may include a program data 2907. Operating system 2905, for example, may be suitable for controlling computing device 2900's operation. In one embodiment, programming modules 2906 may include (e.g., sail adjustment module, user interface module, GPS navigation module, visual navigation module, gyro compass module, power management module, radar module, magnetic compass module, auto pilot module, automatic radar plotting aid module, automatic tracking aid module, metrics module (speed, distance, rate of turn, etc.), echo sounder module, electronic chart display module, long range tracking and identification module, rudder angle module, data recorder module, sight and sound module (ship whistle, forecastle bell, sound reception, navigational lighting, signaling lamp, etc.), pilot module, voyage history module, application 2920). Furthermore, embodiments of the disclosure may be practiced in conjunction with a graphics library, other operating systems, or any other application program and is not limited to any particular application or system. This basic configuration is illustrated in FIG. 29 by those components within a dashed line 2908.

Computing device 2900 may have additional features or functionality. For example, computing device 2900 may also include additional data storage devices (removable and/or non-removable) such as, for example, magnetic disks, optical disks, or tape. Such additional storage is illustrated in FIG. 29 by a removable storage 2909 and a non-removable storage 2910. Computer storage media may include volatile and nonvolatile, removable and non-removable media implemented in any method or technology for storage of information, such as computer readable instructions, data structures, program modules, or other data. System memory 2904, removable storage 2909, and non-removable storage 2910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2900. Any such computer storage media may be part of device 2900. Computing device 2900 may also have input device(s) 2912 such as a keyboard, a mouse, a pen, a sound input device, a touch input device, etc. Output device(s) 2914 such as a display, speakers, a printer, etc. may also be included. The aforementioned devices are examples and others may be used.

Computing device 2900 may also contain a communication connection 2916 that may allow device 2900 to communicate with other computing devices 2918, such as over a network in a distributed computing environment, for example, an intranet or the Internet. Communication connection 2916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2904, including operating system 2905. While executing on processing unit 2902, programming modules 2906 (e.g., sail adjustment module, user interface module, GPS navigation module, visual navigation module, gyro compass module, power management module, radar module, magnetic compass module, auto pilot module, automatic radar plotting aid module, automatic tracking aid module, metrics module (speed, distance, rate of turn, etc.), echo sounder module, electronic chart display module, long range tracking and identification module, rudder angle module, data recorder module, sight and sound module (ship whistle, forecastle bell, sound reception, navigational lighting, signaling lamp, etc.), pilot module, voyage history module, application 2920) may perform processes including, for example, one or more of method 2800's stages as described above. The aforementioned process is an example, and processing unit 2902 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

I. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. A omni direct vessel have circularly symmetric structure which is stronger, simpler to build and repair, due to repeating elements, omni direct structure provide change of movement direction without turning the vessel.

Aspect 2. The omni direct vessel of Aspect 1 have circularly symmetric structure, a omni direct platform with 3 or more hulls equally located around edge of the structure meant providing equal support of a platform base above water level.

Aspect 3. The omni direct platform of Aspect 2 meant to be covered with solar panels to produce electricity from available light.

Aspect 4. The omni direct platform of Aspect 2 had modular structure which allows to separate hulls and support vessel with inflatable support structure which provide support of platform in case of hull separation.

Aspect 5. The hulls of Aspect 2 meant to have UFO shape structure which sustains aerodynamic qualities for sailing in any direction without turning the vessel.

Aspect 6. The hulls of Aspect 2 meant to be covered with solar panels to sustain itself in case of separation from said platform.

Aspect 7. The hulls of Aspect 2 are supported by a rudder blade which defines direction of movement and can change it immediately without turning the vessel, what improve controls over the vessel and maneuverability, additionally one of rudder blade can be attached to central part of the platform, in case if one or more hulls being separated.

Aspect 8. The rudder blades of Aspect 7 have level blades attached the sides meant to provide lift or submersion forth by providing variable angles positioning with perpendicular axis towards the direction of movement.

Aspect 9. The rudder blades of Aspect 7 have magnetic lock attachment to hull meant to prevent damage of connecting parts in case of collision as well have connecting cord to prevent losing part in case of separation.

Aspect 10. The rudder blades of Aspect 7 in bottom part have attached a vibe motion disk, which meant to provide motion to the vessel by transferring short opposite movement to flexible flipper what creates similar to fish tail movement in water.

Aspect 11. The vibe motion disk of Aspect 10 have aerodynamic disc shape structure, can be used to provide lift and submersion forth by providing variable angles positioning with perpendicular axis towards the direction of movement.

Aspect 12. The omni direct circularly symmetric vessel structure of Aspect 1 can be fully autonomous and be controlled remotely by voice, remote control or internet.

Aspect 13. The said structure of the elements of Aspect 12 can be controlled by autopilot system by using sensors and GPS navigation.

Aspect 14. The structure of elements of the vessel of Aspect 12 have ability to change distance between elements by using telescopic structure, to increase size of wind turbine sail, by extending wind turbine blades, platform by change distance between center of platform and hulls, increasing size make more stable and efficient, decreasing size makes structure strong and compact.

Aspect 15. A wind turbine sail having circularly symmetric structure one side bend dish shape made of stiff material, meant to be supported by adjustable structure which can provide 360 degrees of rotation and can provide variety of needed angles, and heights levels for said wind turbine sail.

Aspect 16. The wind turbine sail of Aspect 15 meant to be covered with solar panels to provide electricity.

Aspect 17. The wind turbine sail of Aspect 15 can provide additional lift forth to the vessel.

Aspect 18. The wind turbine sail of Aspect 15 in central part of the sail, have located electric generator, around the edge of the said turbine sail have located wind turbine blades, which meant to provide to rotation forth from wind to generate electricity.

Aspect 19. The wind turbine blades of Aspect 18 have several positions providing capture of the wind as vertical turbine generation and horizontal wind turbine generator, or closed position to increase sail space.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:
1. A system comprising:
a hydrofoil vessel comprising one or more hulls, wherein the hydrofoil vessel is an omni direct vessel having a circularly symmetric structure configured to allow for change of movement direction without turning the vessel, the one or more hulls comprising:

a rudder including one or more rudder blades configured to define a direction of movement and change direction of movement immediately without turning the vessel;
an omni-directional platform connecting the one or more hulls of the hydrofoil vessel; and
wherein the omni-directional platform further comprises at least one of:
a sail;
a wind turbine;
a solar panel;
a hydroelectric motor;
a wind turbine sail;
a hydrofoil controller platform; and
a battery component;
wherein the one or more rudder blades is attached to a central part of the platform.

2. The system of claim 1, wherein the hydrofoil vessel further comprises at least one of:
a sail;
a wind turbine;
a solar panel;
a hydroelectric motor;
a wind turbine sail;
a hydrofoil controller platform; and
a battery component.

3. The system of claim 1, the omni-directional platform having a modular structure configured to allow separate hulls while supporting the hydrofoil vessel with an inflatable support structure.

4. The system of claim 1, wherein the omni-directional platform further comprises three or more hulls equally located around edge of the omni-directional platform configured to provide equal support of a platform base above water level.

5. The system of claim 1, the one or more hulls shaped in a symmetrical elliptical shaped structure configured to provide efficient aerodynamic qualities for sailing in any direction without turning the hydrofoil vessel.

6. The system of claim 1, the one or more hulls further comprising:
one or more solar panels covering a top surface of the one or more hulls;
the one or more rudder blades connected at the base of the one or more hulls; and
wherein the hull is configured to sustain itself independently when separated from the platform.

7. The system of claim 1, wherein the one or more rudder blades is attached to the omni-directional platform.

8. The system of claim 6, further comprising one or more level blades configured to attach to sides providing lift by providing variable angles of positioning with perpendicular axis towards the direction of movement of the hydrofoil vessel.

9. The system of claim 1, the one or more rudder blades, further comprising:
a magnetic lock attachment to at least one of: one or more hulls and the omni directional platform; and
a connecting cord to at least one of: the omni-directional platform and one or more hulls.

10. The system of claim 1, the one or more rudder blades further comprising:
a vibe motion disk attached to a base of the rudder configured to provide vibrating movements to a flexible flipper; and
the flexible flipper configured to provide fish tail propulsion.

11. The system of claim 10, the vibe motion disk further comprising:
having an aerodynamic disc shape structure wherein said structure is configured to provide lift and submersion forth by providing variable angles positioning with perpendicular axis towards the direction of movement.

12. The system of claim 1, wherein the hydrofoil vessel is controlled by one or more of: an autopilot system by using sensors and a GPS navigation, an autonomous computing device, a remote user, wherein the remote user controls the vessel by voice, remote control or a user interface module.

13. The system of claim 12, further comprising:
a telescopic structure, configured to:
increase size of wind turbine by extending wind turbine blades; and
modify the size of the omni-directional platform by adjusting a distance between center of platform and hulls.

14. The system of claim 1, wherein wind turbine sail has a symmetric structure with one side in a bent dish shape, configured to provide 360 degrees of rotation and adjustment to a plurality of angles and height levels for the wind turbine sail.

15. The system of claim 1, wherein the wind turbine sail further comprises solar panels affixed to the wind turbine sail.

16. The system of claim 1, the wind turbine sail further configured to provide additional lift.

17. The system of claim 1, the wind turbine sail further comprises one or more wind turbines, the wind turbine comprising:
an electric generator, wherein the electric generator is positioned of the wind turbine; and
wind turbine blades configured to provide to rotation forth from wind to generate electricity.

18. The system of claim 17, the wind turbine blades, configured to be located in one or more positions to capture wind;
wherein the one or more position is at least one of: a vertical wind turbine, a horizontal wind turbine, and a closed position.

19. A system comprising:
a hydrofoil vessel comprising one or more hulls:
an omni-directional platform connecting the one or more hulls of the hydrofoil vessel; and
wherein the omni-directional platform further comprises at least one of:
a sail;
a wind turbine;
a solar panel;
a hydroelectric motor;
a wind turbine sail, having one or more wind turbines as part of the sail for providing additional lift and generating energy;
a hydrofoil controller platform;
the one or more hulls, further comprising:
a rudder comprising:
one or more rudder blades configured to define a direction of movement, and change direction of movement immediately without turning the vessel;
wherein the one or more rudder blades is attached to a central part of the platform;
a battery component
the system configured to perform a method comprising:

receiving, by a hydrofoil controller platform, power from at least one of: a wind turbine, a solar array, a hydroelectric motor;

storing, by a hydrofoil controller platform, power in a battery component of a hydrofoil vessel;

transferring power to a system of one or modules configured to control the hydrofoil vessel; and adjusting at least one of:
- a sail,
- a wind turbine blade,
- a hydrofoil system,
- a navigation system, and
- an autopilot system.

20. A system comprising:

a hydrofoil vessel comprising one or more hulls, the hydrofoil vessel being an omni direct vessel having a circularly symmetric structure configured to allow for change of movement direction without turning the vessel, the one or more hulls comprising a rudder comprising:
one or more rudder blades configured to define a direction of movement and change direction of movement immediately without turning the vessel;

an omni-directional platform connecting the one or more hulls of the hydrofoil vessel; and wherein the omni-directional platform further comprises at least one of:
- a sail;
- a wind turbine;
- a solar panel;
- a hydroelectric motor;
- a wind turbine sail;
- a hydrofoil controller platform;
- a battery component;

wherein the one or more rudder blades is attached to a central part of the platform; and a computer readable medium comprising, but not limited to, at least one of the following:
- a memory;
- a processor;
- a controller;
- a display;
- a GUI; and at least one of:
- an adjustment module,
- a sail adjustment module,
- a user interface module,
- a GPS navigation module,
- a visual navigation module,
- a gyro compass module,
- a power management module,
- a radar module,
- a magnetic compass module,
- an auto pilot module,
- an automatic radar plotting aid module,
- an automatic tracking aid module,
- a metrics module,
- an echo sounder module,
- an electronic chart display module,
- a long range tracking and identification module,
- a rudder angle module,
- a data recorder module,
- a sight and sound module,
- a pilot module, and
- a voyage history module configured to provide navigation, propulsion, and control of a hydrofoil vessel having one or more hulls.

* * * * *